United States Patent [19]
Hasegawa et al.

[11] Patent Number: 5,293,360
[45] Date of Patent: Mar. 8, 1994

[54] MAGNETIC FIELD GENERATING DEVICE

[75] Inventors: Koyo Hasegawa, Tokyo; Shunpei Kimura, Yokohama, both of Japan

[73] Assignee: Canon Kabushiki Kaisha, Tokyo, Japan

[21] Appl. No.: 895,249

[22] Filed: Jun. 8, 1992

Related U.S. Application Data

[62] Division of Ser. No. 491,194, Mar. 9, 1990, abandoned.

[30] Foreign Application Priority Data

| Mar. 9, 1989 | [JP] | Japan | 1-55210 |
| Mar. 9, 1989 | [JP] | Japan | 1-55211 |
| Mar. 9, 1989 | [JP] | Japan | 1-55212 |
| Mar. 9, 1989 | [JP] | Japan | 1-55214 |
| Mar. 9, 1989 | [JP] | Japan | 1-55217 |
| Mar. 9, 1989 | [JP] | Japan | 1-55218 |

[51] Int. Cl.$^5$ .............................. G11B 13/04
[52] U.S. Cl. ........................ 369/13; 360/114
[58] Field of Search ............ 369/13; 360/114, 59, 360/123; 365/122

[56] References Cited

U.S. PATENT DOCUMENTS

| 3,648,264 | 3/1972 | Gruczelak et al. | 360/123 |
| 4,295,173 | 10/1981 | Romankiw et al. | 360/123 |
| 4,414,554 | 11/1983 | Springer | 360/123 |
| 4,719,527 | 1/1988 | Yoshisato | 360/123 |
| 4,862,437 | 8/1989 | Okada | 369/13 |
| 4,993,009 | 2/1991 | Shilo | 360/114 |

FOREIGN PATENT DOCUMENTS

| 0175201 | 9/1985 | Japan | 369/13 |
| 0237241 | 10/1988 | Japan | 369/13 |
| 0013203 | 1/1989 | Japan | 369/13 |

*Primary Examiner*—Robert J. Pascal
*Assistant Examiner*—Tan Dinh
*Attorney, Agent, or Firm*—Fitzpatrick, Cella, Harper & Scinto

[57] ABSTRACT

There is disclosed a magnetic field generating device for use in a magnetooptical recording apparatus of a magnetic field modulation method. The device includes a planar spiral coil, of which coil pitch is smaller in the peripheral area than that in the central area thereof, thus realizing a relatively wide area of magnetic field of uniform intensity, with a low inductance. Because of the planar structure, the device can be positioned very close to the recording medium, and can achieve the high speed switching required in the magnetic field modulation method, without a large power source.

8 Claims, 23 Drawing Sheets

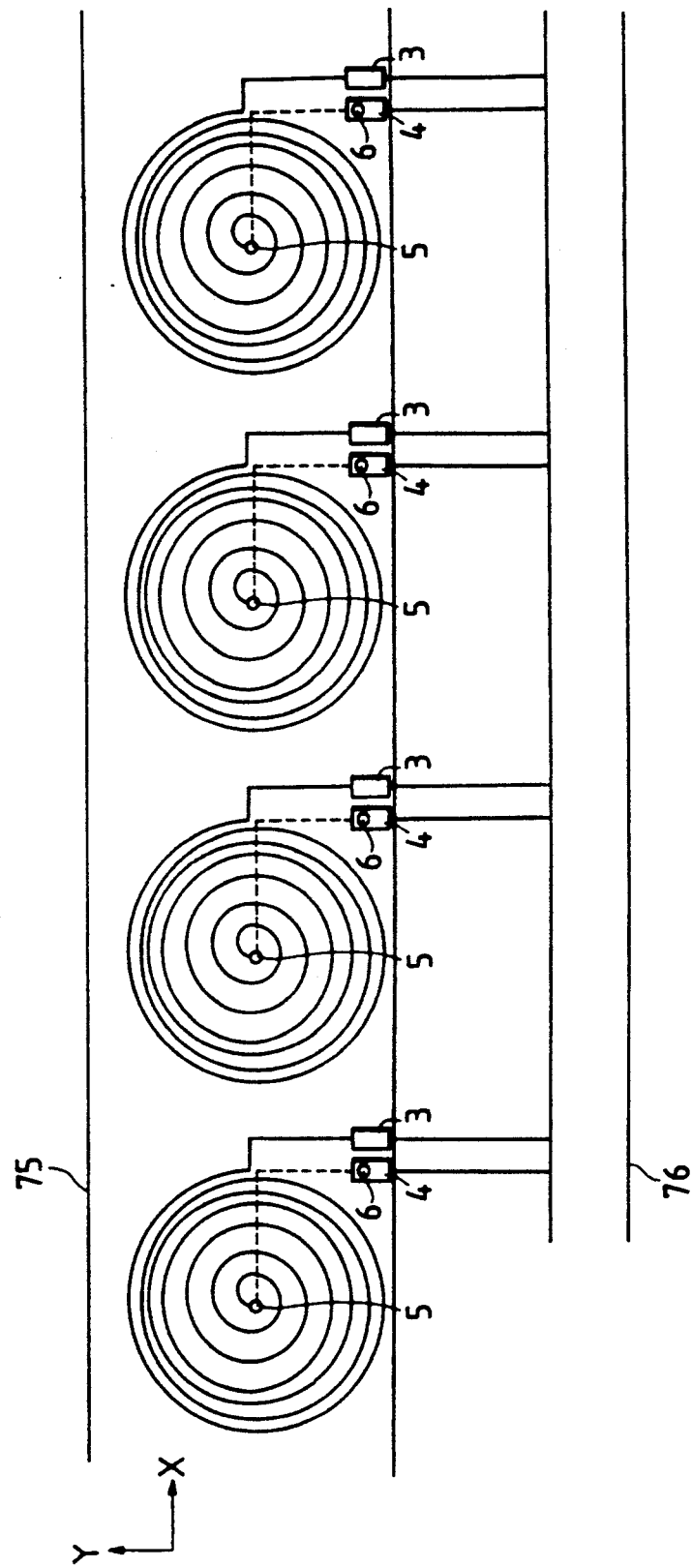

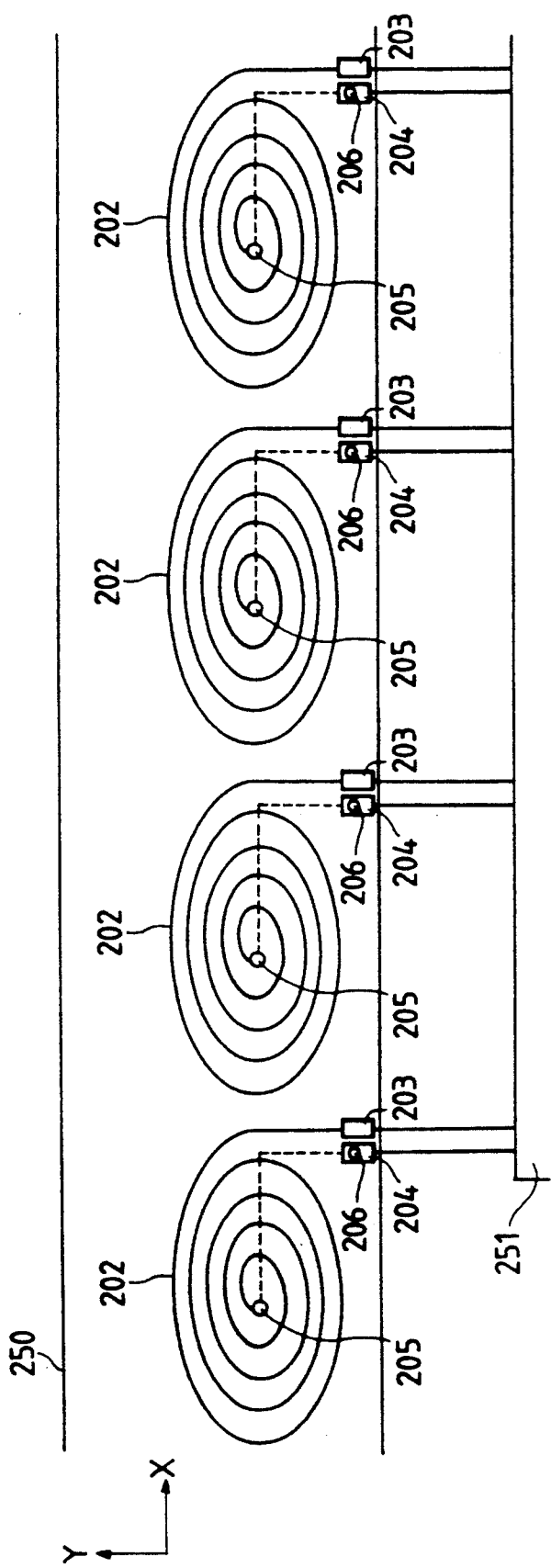

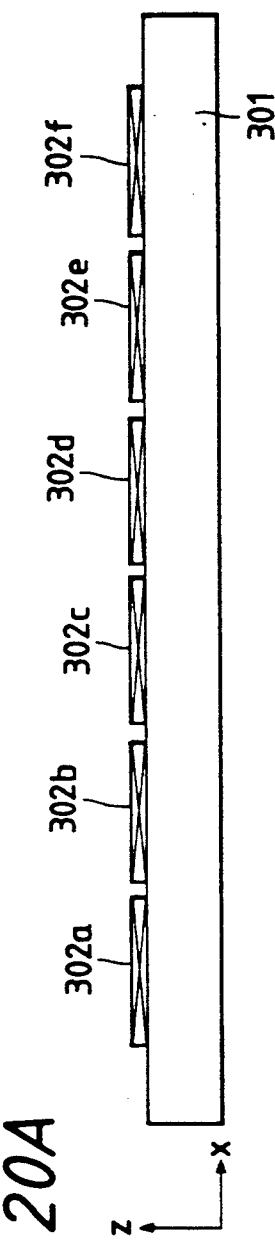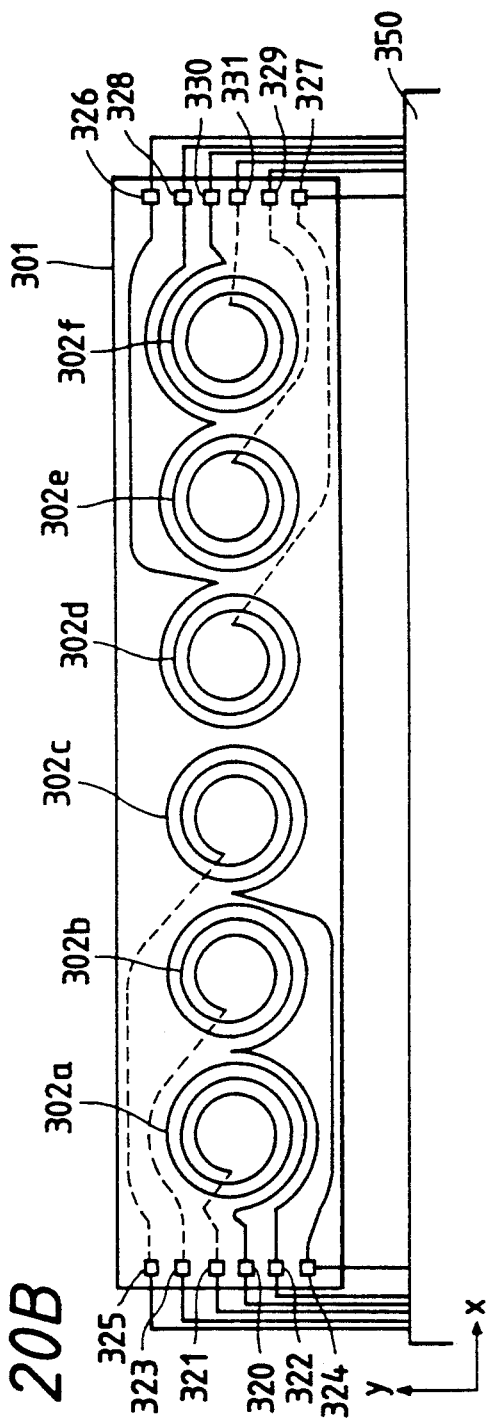
FIG. 20A
FIG. 20B

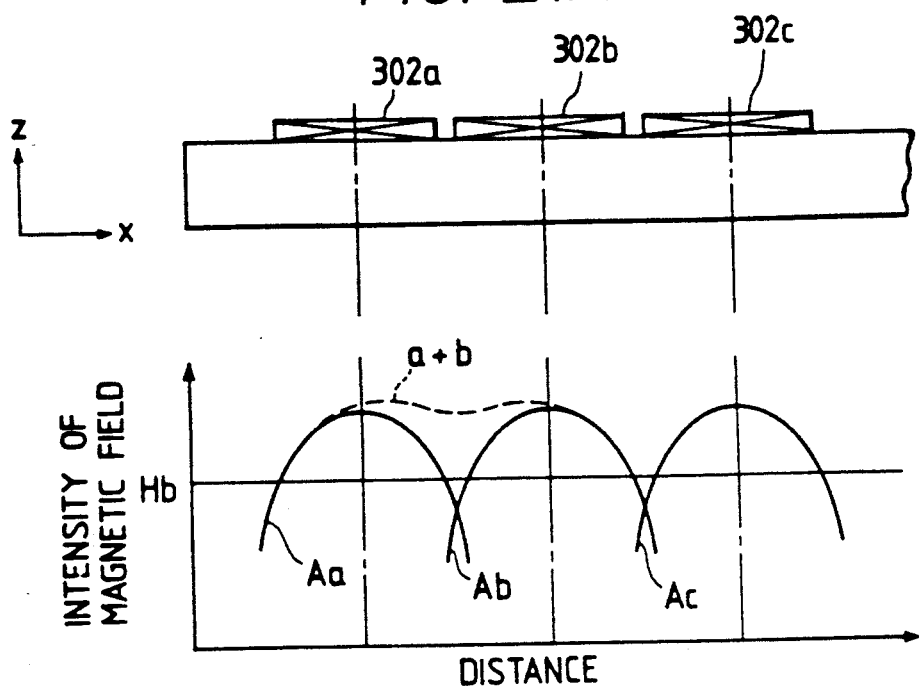
FIG. 21A
FIG. 21B
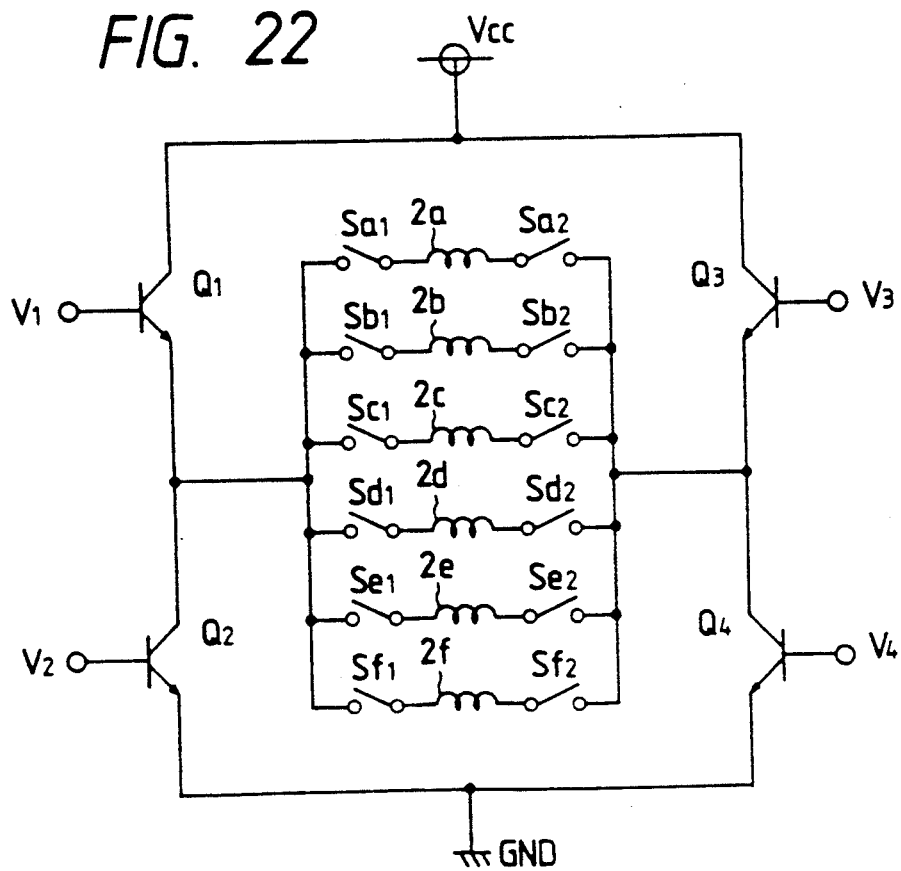
FIG. 22

FIG. 25A
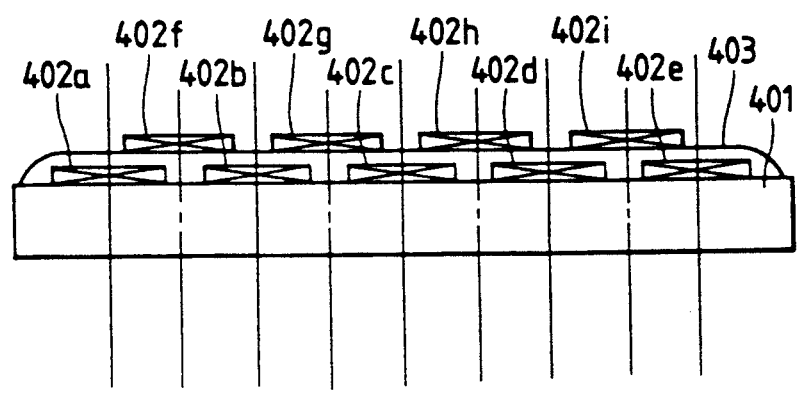
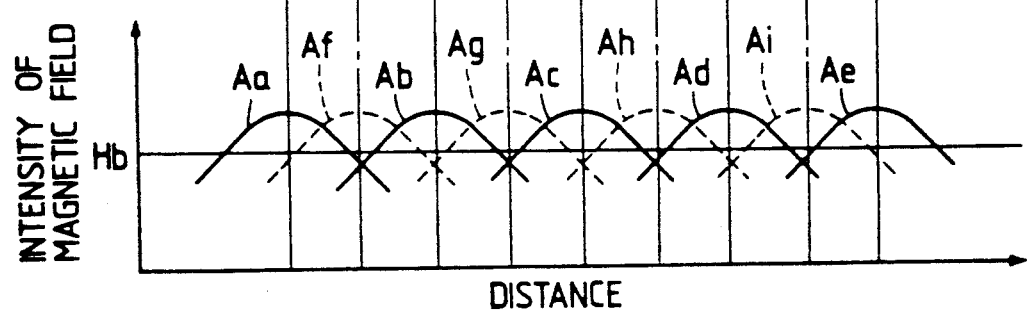
FIG. 25B

APPLIED VOLTAGE ADJUSTMENT SIGNAL

MAGNETIC FIELD GENERATING DEVICE

This application is a division of prior application, Ser. No. 07/491,194 filed Mar. 9, 1990, now abandoned.

BACKGROUND OF THE INVENTION

1. Field of the Invention

The present invention relates to a magnetic field generating device for applying a bias magnetic field to a recording layer of a magnetooptical recording medium in the magnetooptical recording method.

2. Related Background Art

FIG. 1 illustrates a conventional bias magnetic field generating device employed in the magnetooptical recording method of light modulation type. The bias magnetic field generating device 52 is provided on a magnetooptical recording medium, or a magnetooptical disk 50, so as to generate a substantially uniform magnetic field over the entire information recording area in which an optical head 51 is moved under tracking control. A bias field generating power source 53 supplies current to a coil wound on a core of the bias field generating device 52, and the magnetooptical disk 50 is rotated by a spindle motor 55.

In such magnetooptical recording of a light modulation method, record bits (portions of inverted magnetization) are formed by the intensity change of a light beam from the optical head, and the external field from the bias field generating device is used as a supplement. The recording, reproduction and erasure of information are achieved by intensity change of the light beam. Thus the light beam from the optical head is modulated according to the recording signal.

In such structure, the bias field generating device and the power source therefor are inevitably bulky and heavy since the bias magnetic field has to be generated for the entire information recording area 54. Also because of the difficulty of application of a uniform bias field over the entire information recording area 54, the record pits formed in the magnetooptical disk at recording become uneven in size and shape, eventually giving rise to errors in information reading. Furthermore, because of the significant electric power required for generating the bias magnetic field, the bias field generating device 52 causes temperature increase of the magnetooptical disk 50, thereby affecting the conditions of information recording and eventually leading to errors.

For this reason there is also proposed a bias field generating device for applying a bias field only to an area currently subjected to magnetooptical recording by the optical head, and this is called the magnetooptical recording of a magnetic field modulation method. FIG. 2 illustrates such recording, wherein a bias field generating device 62 is linked, by a support member 66, to an optical head 61 positioned across a magnetooptical disk 60, and said device 62 and optical head 61 are mutually so positioned that the light beam 67 for information recording and reproduction from the optical head 61 substantially coincides with the center of the bias field 60 generated by the device 62. Consequently the bias field generating device 62 can follow the movement of the optical head 61 when it is moved in the information recording area 64 under tracking control.

In such magnetooptical recording of the magnetic field modulation method, the recording signal is introduced into the external magnetic field of the bias field generating device. At the information recording, the light beam from the optical head has a constant intensity and is used as a supplement. Thus the external field from the bias field generating device is modulated according to the recording signal.

In such magnetooptical recording, the support member 66 linking the bias field generating device 62 and the optical head 61 is provided, in a part A, with a spring of desired properties, and said bias field generating device 62 is made to float with a small spacing from the surface of the magnetooptical disk 60, utilizing the air flow generated by the rotation of the magnetooptical disk 60 on said surface.

Thus the bias field generating device shown in FIG. 2 can avoid the drawbacks of the bulk, weight and large power consumption associated with the device generating the magnetic field over the entire recording area as shown in FIG. 1, and can therefore eliminate the causes of errors.

However the bias field generating device shown in FIG. 2 is still associated with the following drawbacks. In such a device, since the generated bias field has only a narrow uniform area, so that the light beam 67 from the optical head 61 has to be exactly aligned with the center of the magnetic field generated by the device 62. For this reason there are required highly precise designing, manufacture and alignment, which lead to increased costs.

Also, the bias field generating device can follow the movement of the optical head through the support member 66, when said optical head is moved by a large amount under tracking control, but, in the course of scanning with the light beam, there is required correction control for the vibration of the light beam 67 resulting from vibration of an optical head actuator or for the aberration between the light beam 67 and the center of the bias field resulting from the vibration of the generating device 62. Particularly, in the tracking control of the light beam 67 by a fine tracking control actuator in the optical head 61, the correction control is indispensable for the positional aberration of said bias field generating device 62.

It is therefore conceivable to maintain the uniform area of the bias magnetic field of the generating device at a certain size, thereby enlarging the tolerance of said positional aberration and practically dispensing with said correction control. However, in the above-mentioned bias field generating device, the cylindrical coil employed therein requires a considerable number of turns for generating a required magnetic field, and the magnetic field is difficult to concentrate as the coil requires a certain distance in a direction perpendicular to the magnetooptical disk. Therefore if the magnetic pole is made larger for enlarging the uniform area of the necessary magnetic field, the high frequency drive becomes difficult due to the increase in inductance, and the bias field generating device inevitably becomes bulky and heavy.

SUMMARY OF THE INVENTION

In consideration of the foregoing, the object of the present invention is to provide a bias magnetic field generating device which is compact in size and light in weight, and provides a uniform area of the bias field sufficient for accommodating the positional aberration of the light beam, without increase in inductance.

According to an aspect of the present invention, there is provided a magnetic field generating device comprising:

a substrate;

a magnetic field generating coil provided on said substrate and having different coil pitches in the central area and in the peripheral area; and drive means for driving said magnetic field generating coil.

Also there is provided a magnetooptical recording apparatus utilizing the magnetic field generating device of the present invention, comprising:

an optical head for irradiating a magnetooptical recording medium with a light beam; and a magnetic field generating device for applying a magnetic field to said magnetooptical recording medium, including a substrate, a magnetic field generating coil provided on said substrate and having different coil pitches in the central area and in the peripheral area, and drive means for driving said magnetic field generating coil.

According to another aspect of the present invention, there is provided a magnetic field generating device comprising:

a substrate;

a magnetic field generating coil formed on a first face of said substrate;

terminals formed on a second face different from said first face and connected to said magnetic field generating coil through conductive portions; and drive means connected to said terminals for driving said magnetic field generating coil.

Also there is provided a magnetooptical recording apparatus utilizing the magnetic field generating device of the present invention, comprising:

an optical head for irradiating a magnetooptical recording medium with a light beam; and a magnetic field generating device for applying a magnetic field to said magnetooptical recording medium, including a substrate, a magnetic field generating coil formed on a first face of said substrate, terminals formed on a second face different from said first face and connected to said magnetic field generating coil through conductive portions, and drive means connected to said terminals for driving said magnetic field generating coil.

According to still another aspect of the present invention there is provided a magnetic field generating device comprising:

a substrate;

a magnetic field generating printed coil formed on said substrate and having different sizes in two perpendicular directions; and drive means for driving said magnetic field generating printed coil.

Also there is provided a magnetooptical recording apparatus utilizing the magnetic field generating device of the present invention, comprising:

an optical head for irradiating a magnetooptical recording medium with a light beam; and a magnetic field generating device for applying a magnetic field to said magnetooptical recording medium, including a substrate, a magnetic field generating printed coil formed on said substrate and having different sizes in two perpendicular directions, and drive means for driving said magnetic field generating printed coil.

According to still another aspect of the present invention there is provided a magnetic field generating device comprising:

a substrate provided with a plurality of magnetic field generating printed coils; and drive means for driving said magnetic field generating printed coils.

Also there is provided a magnetooptical recording apparatus utilizing the magnetic field generating device of the present invention, comprising:

an optical head for irradiating a magnetooptical recording medium with a light beam; and a magnetic field generating device for applying a magnetic field to said magnetooptical recording medium, including a substrate provided with a plurality of magnetic field generating printed coils, and drive means for driving said magnetic field generating printed coils.

According to still another aspect of the present invention, there is provided a magnetic field generating device comprising:

first plural magnetic field generating coils formed on a first face;

second plural magnetic field generating coils formed on a second face different from said first face; and drive means for driving said first and second magnetic field generating coils.

Also there is provided a magnetooptical recording apparatus utilizing the magnetic field generating device of the present invention, comprising:

an optical head for irradiating a magnetooptical recording medium with a light beam; and a magnetic field generating device for applying a magnetic field to said magnetooptical recording medium, including first plural magnetic field generating coils formed on a first face, second plural magnetic field generating coils formed on a second face different from said first face, and drive means for driving said first and second magnetic field generating coils.

There is also provided a magnetooptical recording apparatus utilizing the magnetic field generating device of the present invention, comprising:

an optical head for irradiating a magnetooptical recording medium with a light beam; and a magnetic field generating device for applying a magnetic field to said magnetooptical recording medium, including a substrate provided with plural magnetic field generating printed coils, and drive means for driving said magnetic field generating printed coils; and regulation means for regulating the distance between said magnetic field generating device and said magnetooptical recording medium.

BRIEF DESCRIPTION OF THE DRAWINGS

FIGS. 7, 14 and 19 are views showing arrangements of plural magnetic field generating coils;

FIGS. 20A and 20B are respectively a lateral view and a plan view of an embodiment of the magnetic field generating device of, the present invention;

FIGS. 21A and 21B are charts showing the distribution of a magnetic field in the bias field generating device of the present invention;

FIG. 22 is a circuit diagram of a control circuit for the magnetic field generating coils;

FIGS. 25A and 25B are charts showing the distribution of a magnetic field in the bias field generating device of the present invention;

DESCRIPTION OF THE PREFERRED EMBODIMENTS

Figure 1:
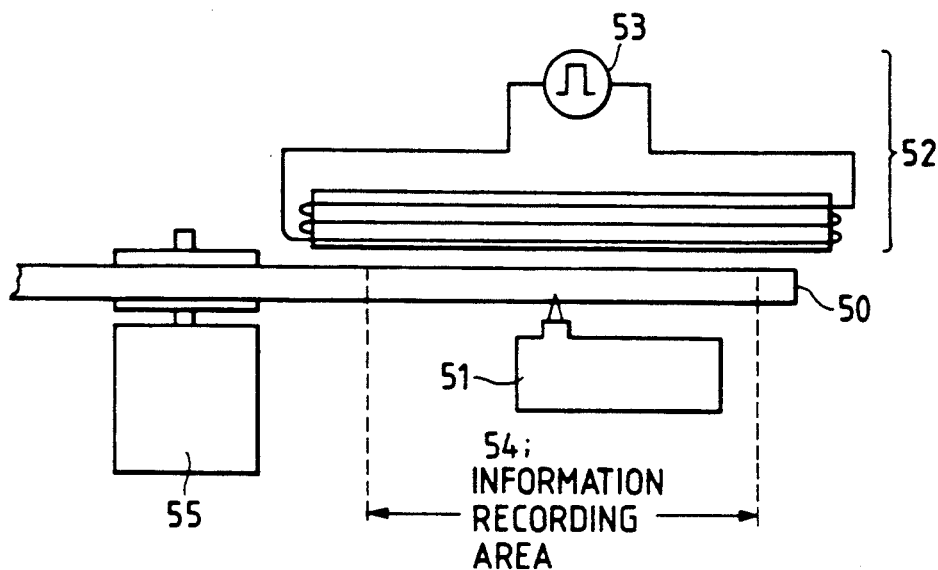
FIGS. 1 and 2 are schematic views of magnetooptical recording apparatus with conventional bias magnetic field generating devices.

Now the present invention will be clarified in detail by embodiments thereof shown in the attached drawings.

In the following description, there will only be described the bias field generating device of the present invention, since the entire structure of the magnetooptical recording apparatus is similar to the aforementioned conventional example, shown in FIG. 2, based on the magnetic field modulation method. The bias field generating device of the present invention is formed, by thin film technology as shown in FIGS. 3A and 3B, by forming a conductive pattern 8 on a block 1 of a magnetic material constituting a substrate, depositing an insulating layer 7 except for connection points 5, 6 at the both ends of said conductive pattern 8, and forming, on the upper surface of said insulating layer 7, a spiral printed coil 2, a terminal 3 connected to the outer end of said coil 2 and a terminal 4 connected to said conductive pattern 8 at said point 6 by conductive patterns. The inner end of said coil 2 is connected to said point 5. If necessary there may be provided a protective insulating layer on said insulating layer 7, so as to cover the printed coil 2.

The magnetic block 1 is preferably composed of a magnetic material with satisfactory high frequency characteristics, such as high frequency ferrite, having a low high-frequency loss and a high magnetic permeability. In the present embodiment, the printed conductors such as the conductive pattern 8 and the printed coil are preferably formed by evaporation or sputtering, with a highly conductive material such as copper. There may also be employed a method of leaving the desired pattern, such as etching.

Printed coil 2 is so constructed that the pitch thereof decreases gradually or stepwise in certain zones, in comparison with that in the central area. The width of the conductor of the coil 2 can be constant. Also the external diameter of said coil 2 is preferably so selected that the uniform area of the bias magnetic field in the vertical direction generated by said coil 2 covers the movable range of the light beam moved by the precise tracking actuator of the optical head.

Such a bias field generating coil generates a magnetic field in a direction $+Z$ or $-Z$ respectively when current is supplied from the terminal 3 to 4 or from 4 to 3, by a power source 9. The information recording is achieved by such modulation of the external magnetic field.

Figure 4:
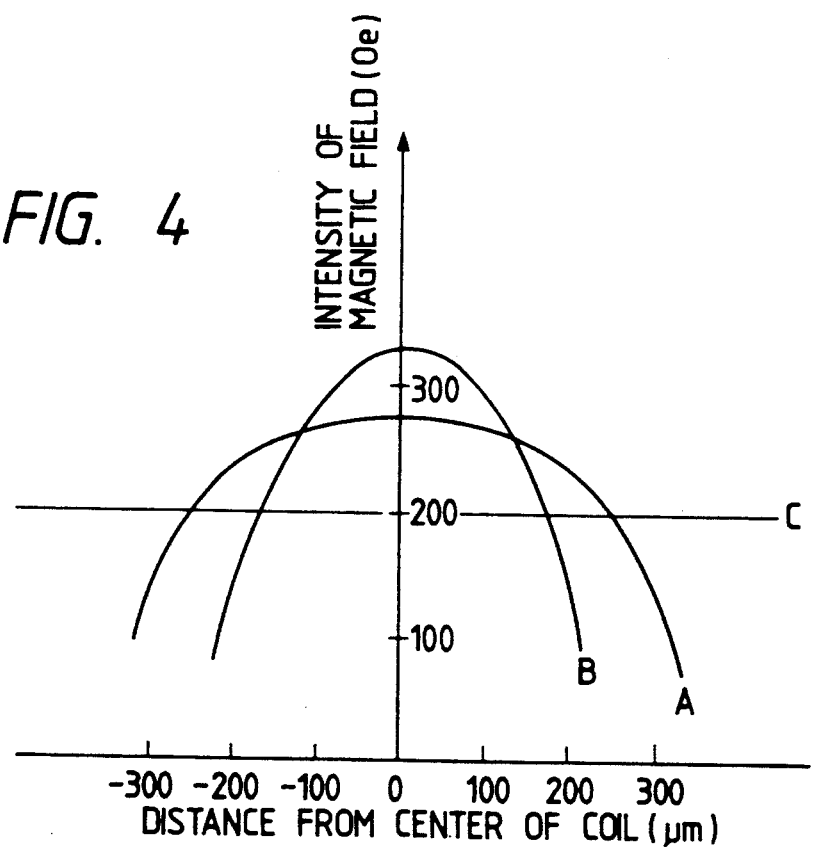
FIG. 4 is a chart showing the distribution of magnetic field of the bias field generating device of the present invention.

FIG. 4 illustrates the distribution of the bias magnetic field generated by the bias field generating device explained above, and shows, in the ordinate, the magnitude of a vertical magnetic field component applied to the recording layer of the magnetooptical disk, as a function of the distance from the center of the printed coil in the abscissa. In FIG. 4, a curve A represents the distribution of the magnetic field generated by the bias field generating device of the present invention, while a curve B represents that of the magnetic field generated by a spiral coil of the same diameter with a constant coil pitch. A line C indicates the minimum bias field required for recording. Thus, in consideration of the alignment error between the optical head and the bias field generating device, there is required a magnetic field of at least 200 Oe in a range (for example $+200$ μm) including the movable range of the light beam by the tracking actuator, and the present invention can provide a uniform magnetic field of a wide area sufficiently satisfying this condition. Also, the bias field generating device can be made more compact and lighter, because it can provide the uniform magnetic field of a given size by a coil of smaller diameter, in comparison with a cylindrical coil or a planar printed coil with a constant coil pitch. Furthermore, an excellent high frequency switching property can be obtained as the inductance of the coil can be reduced.

Figure 5:
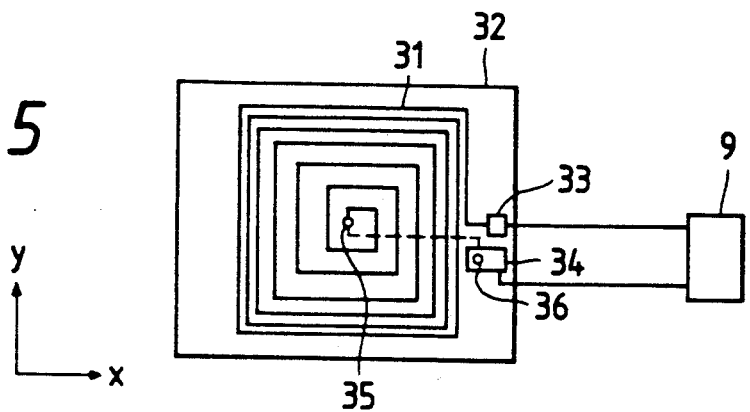
FIG. 5 is a plan view of another embodiment of the bias field generating device of the present invention.

FIG. 5 shows another embodiment of the bias field generating device of the present invention, in a plan view of an upper printed coil 31. Coil 31 is formed as a square spiral coil with the coil pitch smaller in the peripheral area than in the central area. There are also shown a magnetic block 32; terminals 33, 34; and connection points 35, 36.

Figure 6A:
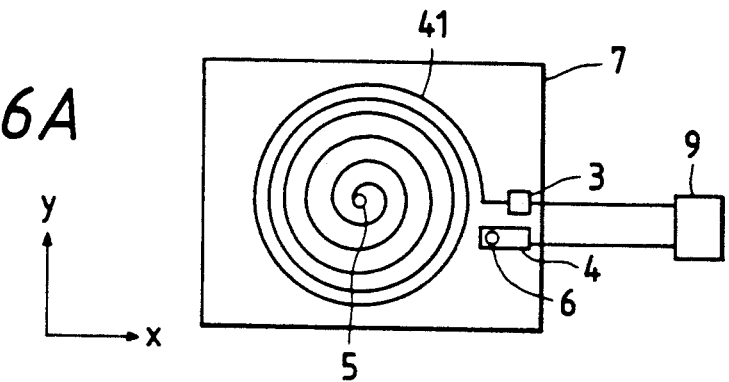
FIGS. 6A and 6B are a plan view and a partially removed plan view of still another embodiment of the bias field generating device of the present invention.
Figure 6B:
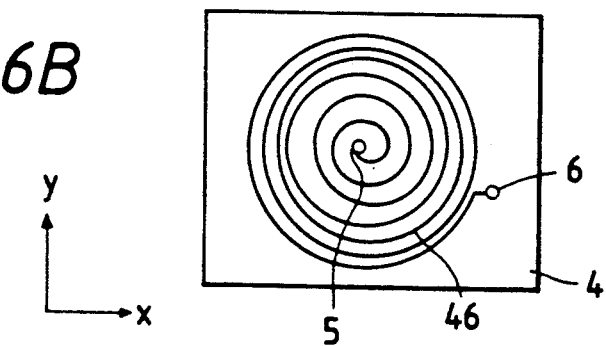

FIGS. 6A and 6B show still another embodiment of the bias field generating device of the present invention, in which the upper printed coil 41 is similar to that shown in FIG. 3, but the conductor pattern 8 is replaced by a lower printed coil 46 wound inversely to said upper coil 41 and connected thereto at a point 5. Thus the number of turns of the coil is doubled, and a doubled magnetic field can be generated with the same driving current. Such structure is effective in case the bias field generating device cannot be positioned close to the magnetooptical disk, or in case a large bias magnetic field is required, or for any other reason.

The printed coil in the foregoing embodiments is circular or square, but it may also be formed in other shapes such as oval or rectangular.

As explained in the foregoing, according to the present invention, in the magnetooptical recording method in which a magnetooptical recording medium is heated with a light beam from an optical head and is subjected simultaneously to the application of a bias magnetic field so as to represent information by the direction of magnetization of a magnetic domain, a magnetic field generating coil having a main field component perpendicular to the recording layer of said recording medium is formed in a plane close to said recording medium with the coil pitch smaller in the peripheral area than in the central area.

In each of the foregoing embodiments there is employed a coil, but there may be employed plural magnetic field generating coils.

FIG. 7 shows an embodiment in which plural magnetic field generating coils are provided on the same substrate 75 composed of a magnetic block. A power source 76 is provided for driving said magnetic field generating coils. In FIG. 7, a direction X is the direction of tracking control of the optical head, and a direction Y is the direction of relative movement between the magnetic field generating device and the recording medium.

Figure 8:
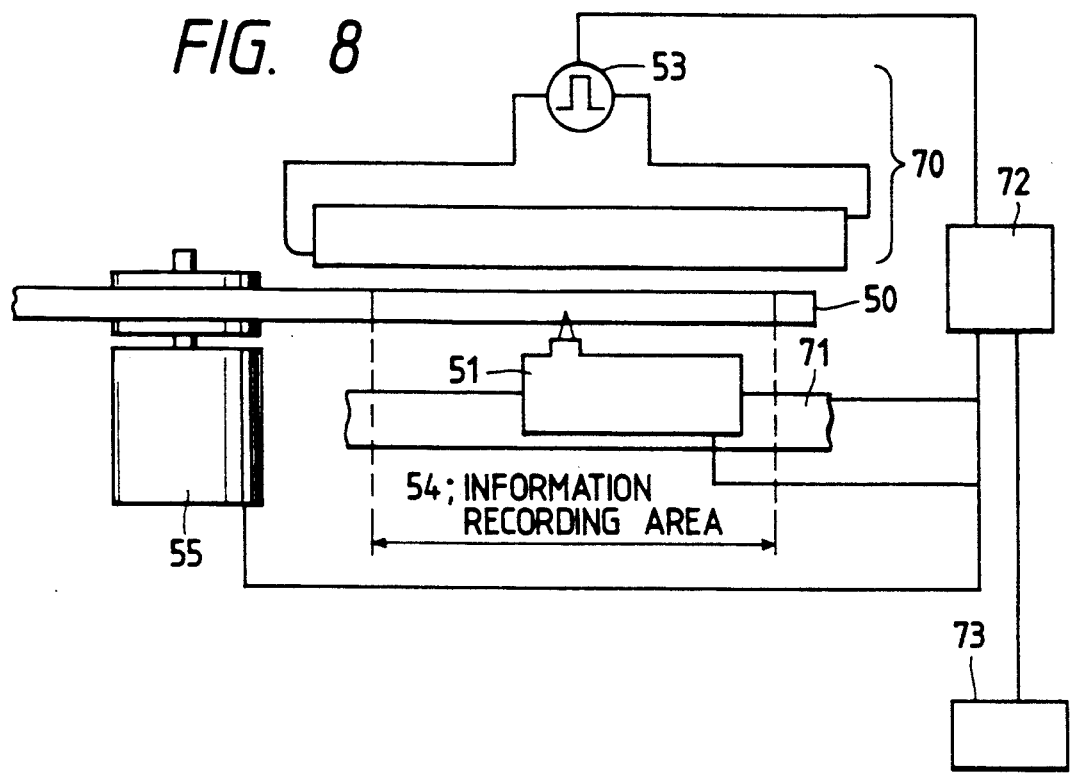
FIG. 8 is a schematic view of a magnetooptical recording apparatus utilizing the bias field generating device of the present invention.

FIG. 8 shows a magnetooptical recording apparatus employing the bias field generating device of the present invention, shown in FIG. 7. A bias field generating device 70 of the present invention is positioned opposite to an optical head 51, across a magnetooptical disk 50 constituting a recording medium, so as to generate a bias magnetic field over the entire information recording area 54 in which the optical head 51 moves under tracking control. A coil of said device 70 receives current from a bias field generating power source 53, and the magnetooptical disk 50 is rotated by a spindle motor 55. Naturally, in the bias field generating device 70 of the present invention, the magnetic field generating coil has different coil pitches between the peripheral area and the central area as explained before. There are also shown a linear motor 71 for moving the optical head 51 in the direction of tracking control; a control unit 72 for controlling the functions of the bias field generating device 70, optical head 51, linear motor 71 and spindle motor 55; and a process unit 73 for sending or receiving signals to or from the control unit 72. When plural coils are provided as explained above, over the entire information recording area in which the optical head moves under tracking control, a coil corresponding to the position of the optical head is driven for modulation at the recording, as the optical head moves.

According to the present invention, as detailedly explained in the foregoing, the magnetic field generating coil is formed on a plane close to the recording medium, with the coil pitch smaller in the peripheral area than in the central area of the coil. Consequently, in the tracking, since a uniform magnetic field area can be easily obtained to cover the movable range of the light beam from the optical head, there can be dispensed with the relative alignment between the optical head and the bias field generating device. This fact is advantageous in structure and in control, and can reduce the cost and the errors in the recording operation. Also since a uniform area of magnetic field can be obtained with a necessary intensity, without the use of an enlarged magnetic pole, there is obtained a bias field generating device of low inductance, enabling high frequency switching operation. Also the more compact bias field generating device ensures high speed movement of the optical head for example in the seeking operation, and ensures excellent response to transient variation in the air flow in a floating structure, reduced vibration, satisfactory stability and high reliability.

In the following there will be explained a structure of the bias field generating device that can expand the uniform area of magnetic field without an increase in the inductance and can be supported in a floating mechanism.

Figure 9A:
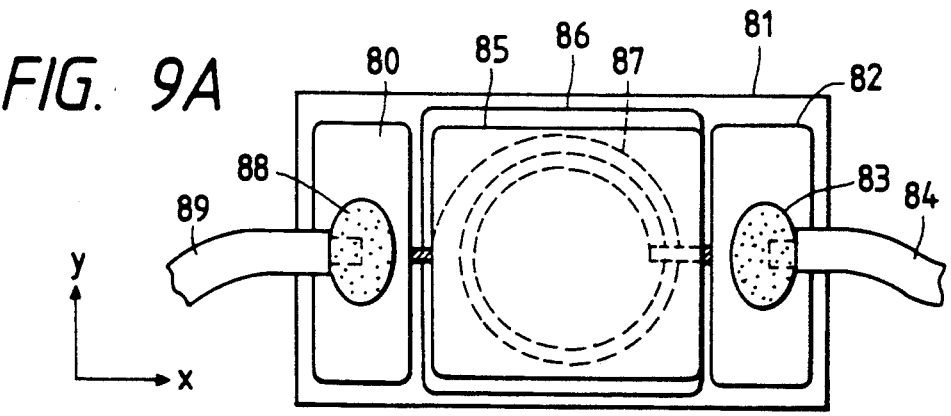
FIGS. 9A and 9B are respectively a plan view and a cross-sectional view of a bias field generating device.
Figure 9B:
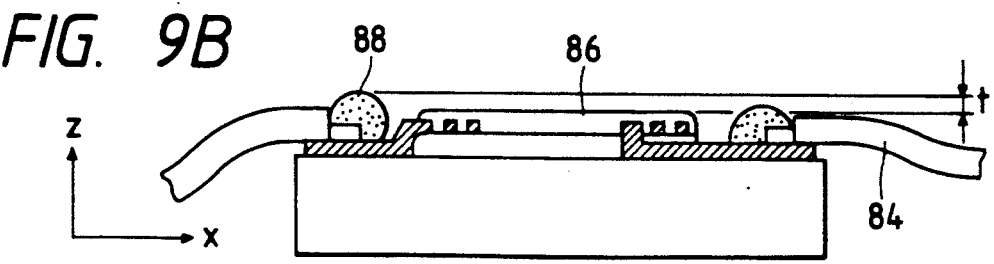

As shown in FIG. 9, there can be conceived a bias field generating device employing a spiral coil, thereby expanding the necessary uniform area of magnetic field without increasing the inductance. A printed coil 87 patterned by a thin film etching technology on a magnetic block 81 receives a driving current from an unrepresented power source through lead wires 84, 89 to generate a perpendicular magnetic field in the Z-direction. Coil 87 is formed on an insulating layer 85 provided on the magnetic block 81, and is covered by a protective film 86. On both sides of said printed coil 87 on the magnetic block 81, there are formed terminal patterns 80, 82 to which said lead wires 84, 89 are connected by soldering or bonding.

Such structure is associated with a decisive defect that, as will be clear from FIG. 9A, the soldered or bonded portions 83, 88 protrude upwards on the terminal patterns 80, 82 by a height t beyond the surface of the protective film 86, whereby the bias field generating device, particularly the printed coil 87 thereof cannot be positioned close enough to the surface of the magnetooptical disk.

This fact hinders the intension of obtaining an expansion in the uniform area of a necessary magnetic field without an increase in the inductance, and becomes a structural disturbance in the floating support for the bias field generating device shown in FIG. 9.

In practice, it is difficult to reduce such protrusion of soldering or bonding below 100 μm even under highly sophisticated connection technology. Consequently the floating mechanism is unemployable, in consideration of the fact that the gap between said bias field generating device and the surface of the magnetooptical disk in the floating system has to be in the range of 3—4 μm.

In the following there will be explained an embodiment of the magnetic field generating device of the present invention, taking the above-explained facts into consideration.

Figure 10A:
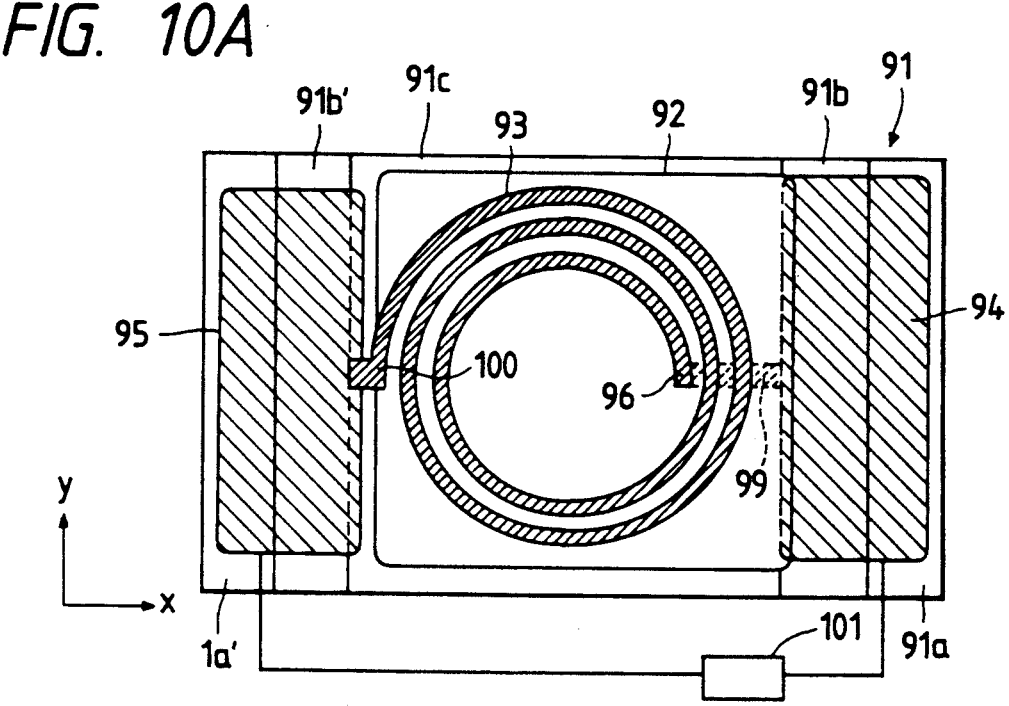
FIGS. 10A and 10B are respectively a plan view and a cross-sectional view schematically showing an embodiment of the magnetic field generating device of the present invention.

Now said embodiment will be explained in detail with reference to FIGS. 10A and 10B, which show a bias field generating device for generating a bias magnetic field by a printed coil 93 formed by a thin film technology on a magnetic block 91 constituting a substrate and having lowered portions 91a, 91a' on both sides. Said magnetic block 91 is composed of a material of satisfactorily high frequency properties such as high frequency ferrite, which should preferably be provided with a low high-frequency loss and a high magnetic permeability. Magnetic block 91 has a stepped surface consisting of said lower portions 91a, 91a' and a central upper portion 91c mutually connected by sloped portions 91b, 91b'. Terminal areas 94, 95 are formed on said lower portions 91a, 91a' and on said sloped portions 91b, 91b', and a conductive portion 99 is extended inwards in the central upper portion 91c. An insulating layer 97 is laminated on said upper portion 91c, excluding a connection point 96 at the end of said conductive portion 99, and the aforementioned printed coil 93 is provided on said insulating layer. Said printed coil 93 is formed as a spiral, of which the internal end is connected to said connection point 96 while the external end is connected to said terminal area 95 through a conductive portion 100. An insulating layer 92 is formed thereon for protecting the coil 93.

The above-explained bias field generating coil generates a magnetic field in a direction +Z or —Z respectively when current is supplied from the terminal 94 to 95 or from 95 to 94 by a power source 101 for driving said coil. The plane of the terminals 94, 95 is more separated, than the surface of the upper portion 91c on which the coil 93 is provided, from the surface of the magnetooptical recording medium (not shown), which is positioned above the insulating layer 92 in FIG. 10B. For this reason, the soldering or bonding used for connecting the lead wires from the power source 101 to said terminals 94, 95 does not protrude from the plane of the printed coil 93 toward the magnetooptical recording medium. Stated differently, the step between the plane of the printed coil 93 and the lower portions 91a, 91a' on which the terminals 94, 95 are formed can be selected at a value, for example 0.25 mm, exceeding the expected thickness of solder, for example 0.2 mm.

Figure 10B:
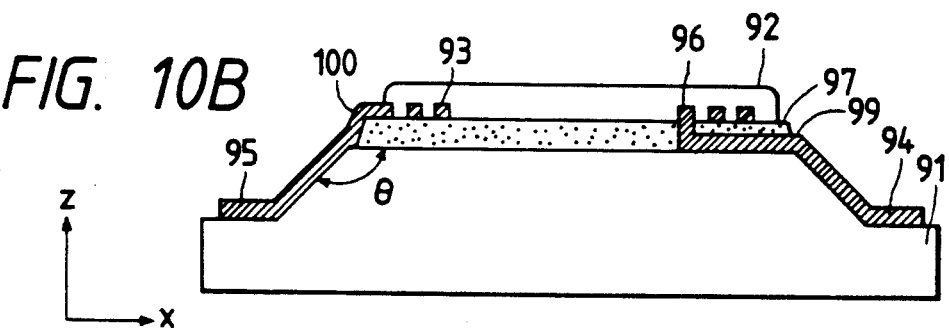
Figure 11A:
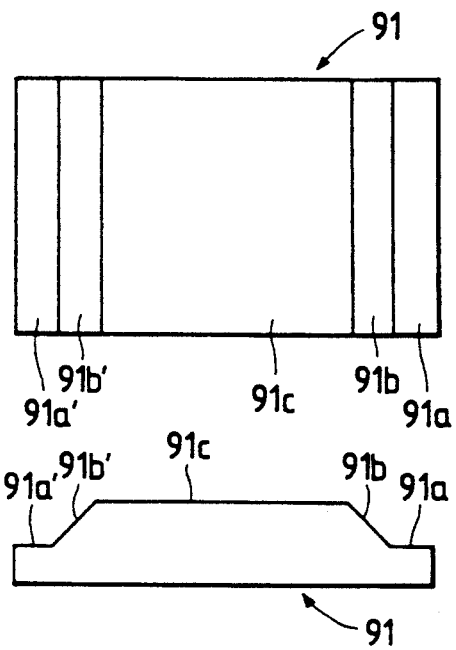
FIGS. 11A, 11A', 11B, 11B', ..., 11H and 11H' are plan views and cross-sectional views showing an example of manufacturing process for the magnetic field generating device of the present invention.
Figure 11A:
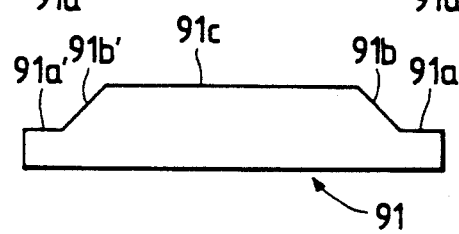
Figure 11B:
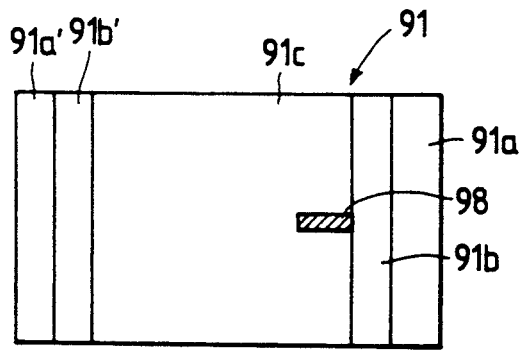
Figure 11B:
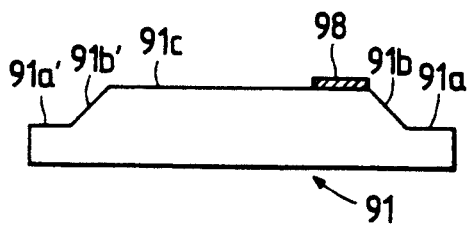
Figure 11C:
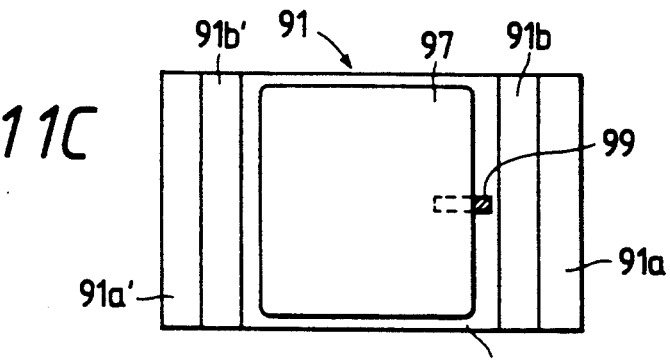
Figure 11C:
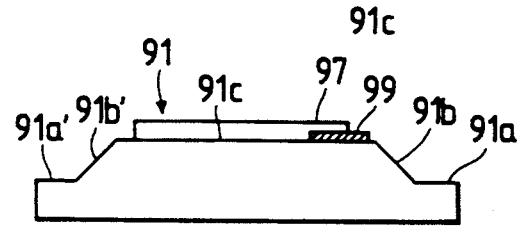
Figure 11D:
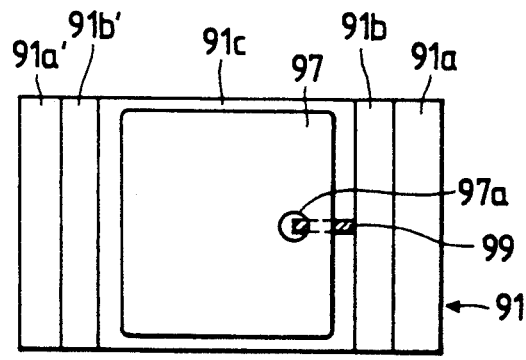
Figure 11D:
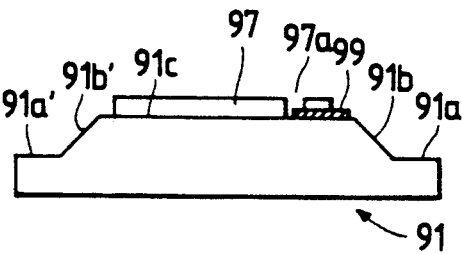
Figure 11E:
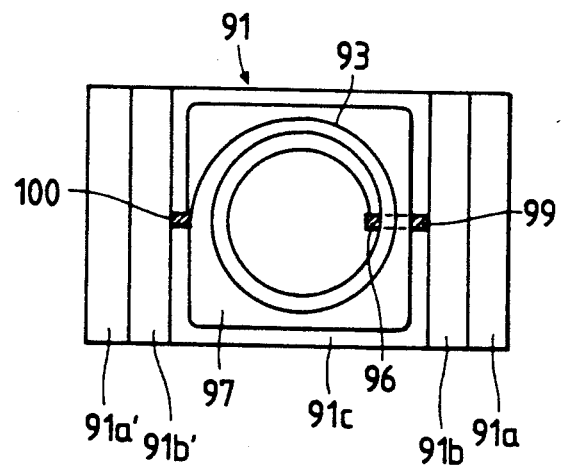
Figure 11E:
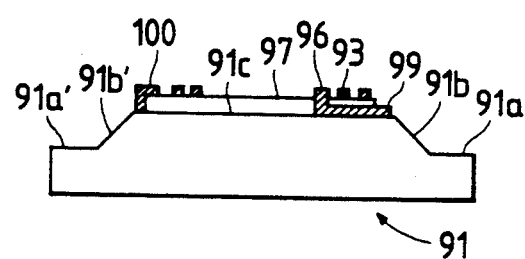
Figure 11F:
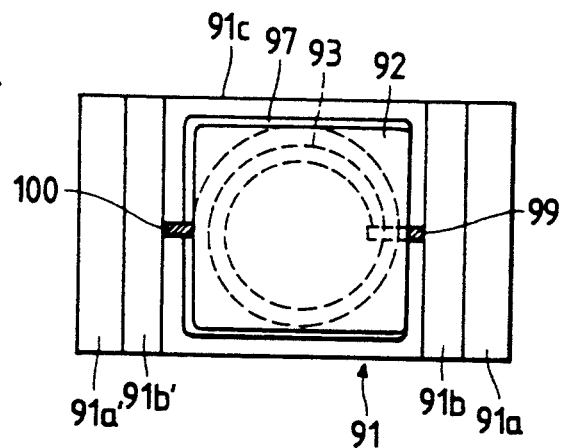
Figure 11F:
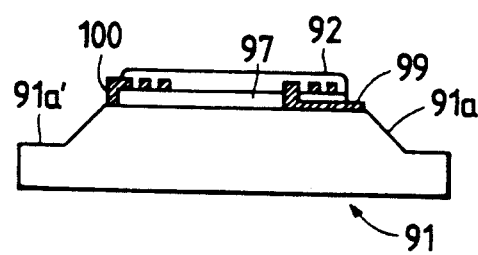
Figure 11H:
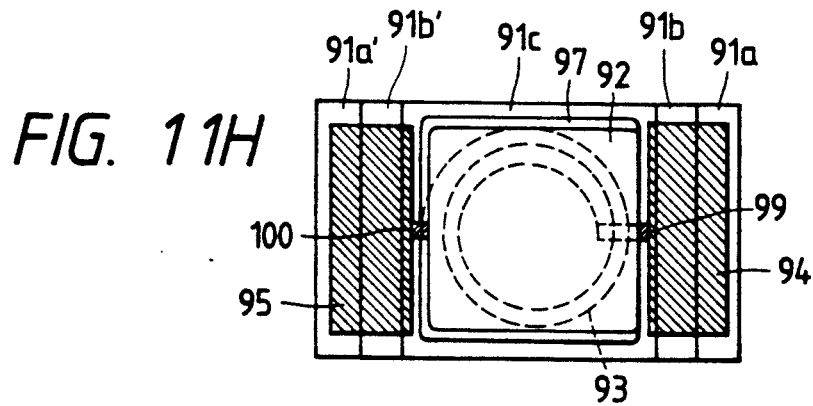
Figure 11H:
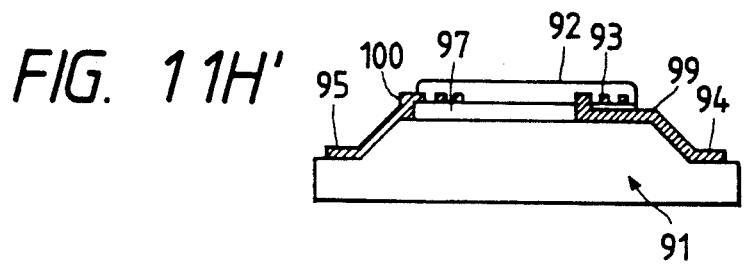
Figure 11G:
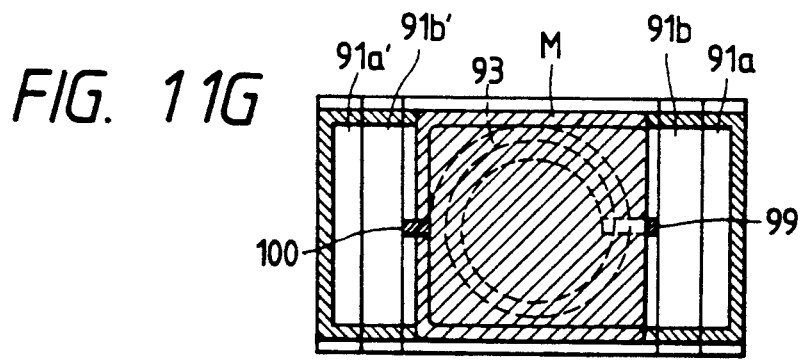
Figure 11G:
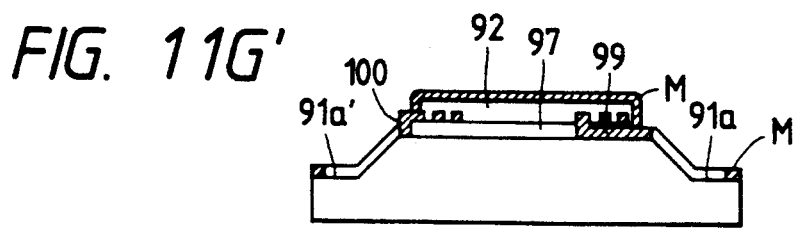

In consideration of a fact that evaporation or sputtering will be employed for forming the terminals 94, 95 also on the sloped portions 91b, 91b', the angle θ of said sloped portions 91b, 91b' with respect to the central upper portion 91c is preferably selected in excess of 90°, for example 135° as shown in FIG. 10B.

Now reference is made to FIG. 11 for explaining the manufacturing process of the bias field generating device explained above. At first a magnetic block 91 having the upper portion 91c, sloped portions 91b, 91b' and lower portions 91a, 91a' on the surface as shown in 11A, 11A' is formed by shaping from a block or by press molding. Then, as shown in 11B, 11B', a conductor pattern 98 constituting the conductive portion 99 is formed by evaporation or sputtering on the upper portion 91c. Then the insulating layer 97 is formed on the upper portion 91c as shown in 11C, 11C', and a hole 97a is formed in a position corresponding to the connection point 96 as shown in 11D, 11D', thereby exposing a part of the conductor pattern 98 in the bottom thereof. Then, as shown in 11E, 11E', the printed coil 93 is formed by a conductor pattern, and the internal end of said coil is connected to the conductive portion 99 at the connection point 96. Also at the external end there is formed the conductive portion 100, which extends beyond the edge of the insulating layer 100 to the edge of the upper portion 91c. In this state the insulating layer 92 is formed for protecting the printed coil 93 as shown in 11F, 11F', and a mask M is formed excluding the terminal patterns as shown in 11G, 11G'. The terminals 94, 95 are formed in this state by evaporation or sputtering, and said mask M is removed to obtain a bias field generating device of the structure shown in 11H, 11H'.

Figure 12A:
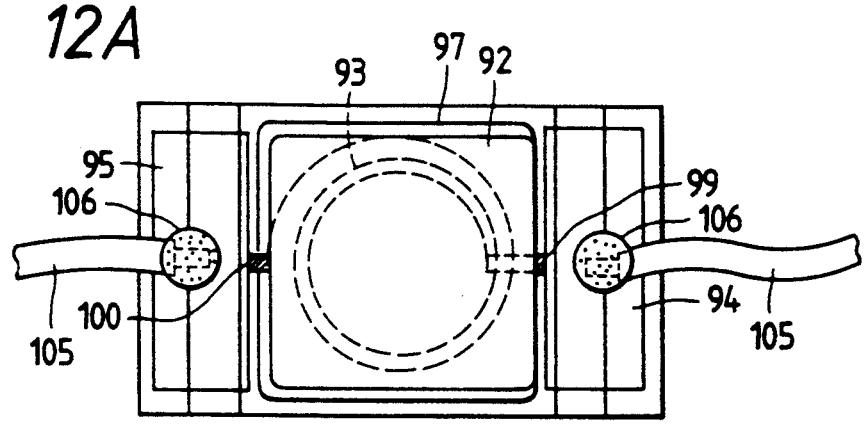
FIGS. 12A and 12B are respectively a plan view and a cross-sectional view showing the mode of mounting of lead wires to the magnetic field generating device.
Figure 12B:
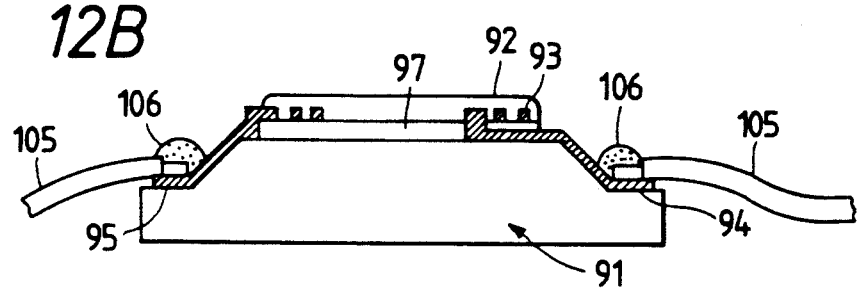

FIGS. 12A and 12A' show the mode of mounting, on such a bias field generating device, lead wires 105 to the terminals 94, 95 by soldering or bonding 106. As shown in FIG. 12B, the soldering or bonding 106, being formed on the lower portions 91a, 91a', does not reach the upper portion 91c on which the printed coil 93 is provided.

Figure 13A:
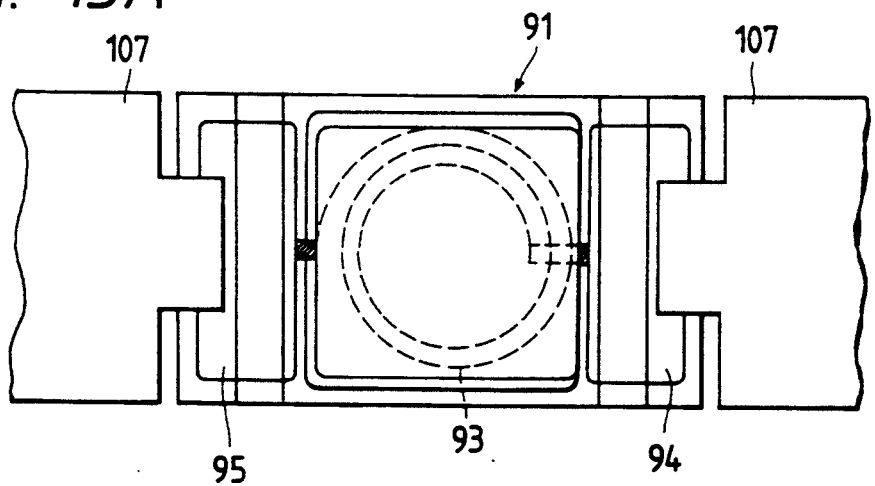
FIGS. 13A and 13B are respectively a plan view and a cross-sectional view showing the mode of supporting with a support member serving also as lead wires for the magnetic field generating device.
Figure 13B:
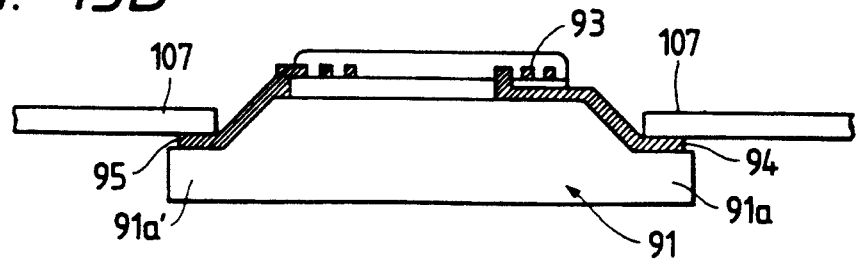

FIGS. 13A and 13B show the state of supporting the bias field generating device with support members 107 functioning also as lead wires. Support members 107 are preferably composed of elastic members and may be designed to serve as arms for supporting the bias field generating device in a floating state. The terminals 94, 95 are electrically connected to said support members 107.

Figure 2:
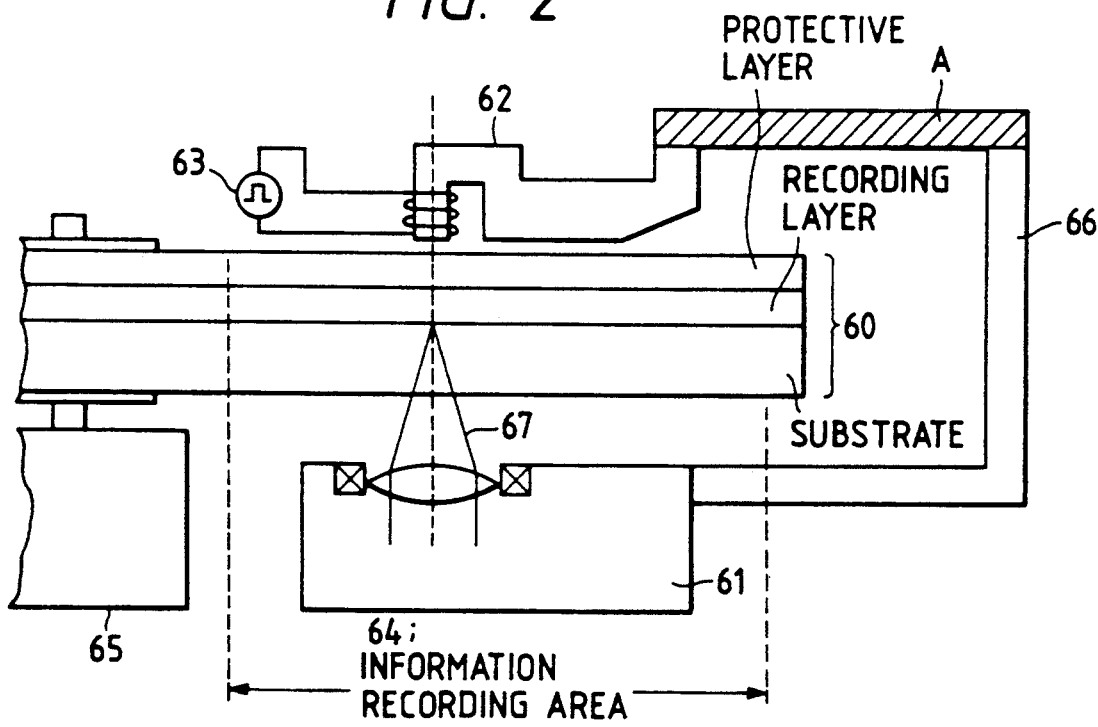
Figure 3A:
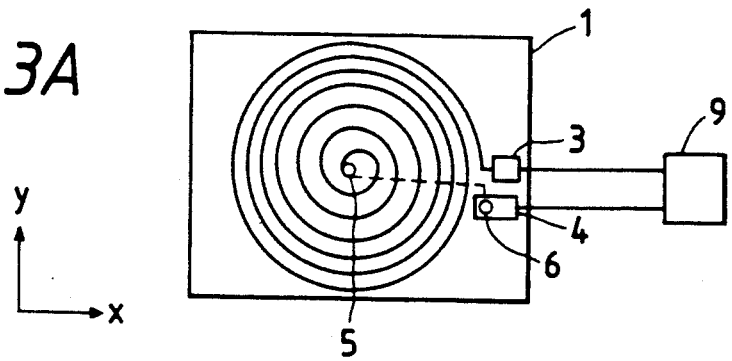
FIGS. 3A and 3B are respectively a plan view and a cross-sectional view of a bias magnetic field generating device embodying the present invention.
Figure 3B:
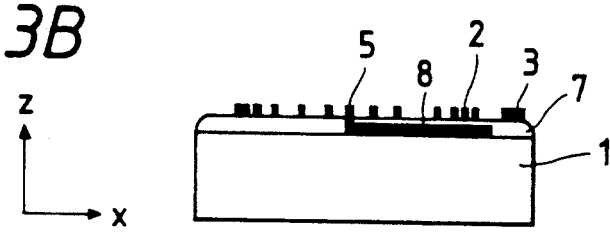

The above-explained bias field generating device having a coil on a first plane and terminals, connected to said coil through conductive portions, on a second plate spaced by a predetermined amount from said first plane may be employed in the magnetooptical recording apparatus shown in FIG. 2, in place of the bias field generating device 62.

In each of the foregoing embodiments shown in FIGS. 10 to 13, there is employed a coil, but there may be employed plural magnetic field generating coils.

Figure 14:
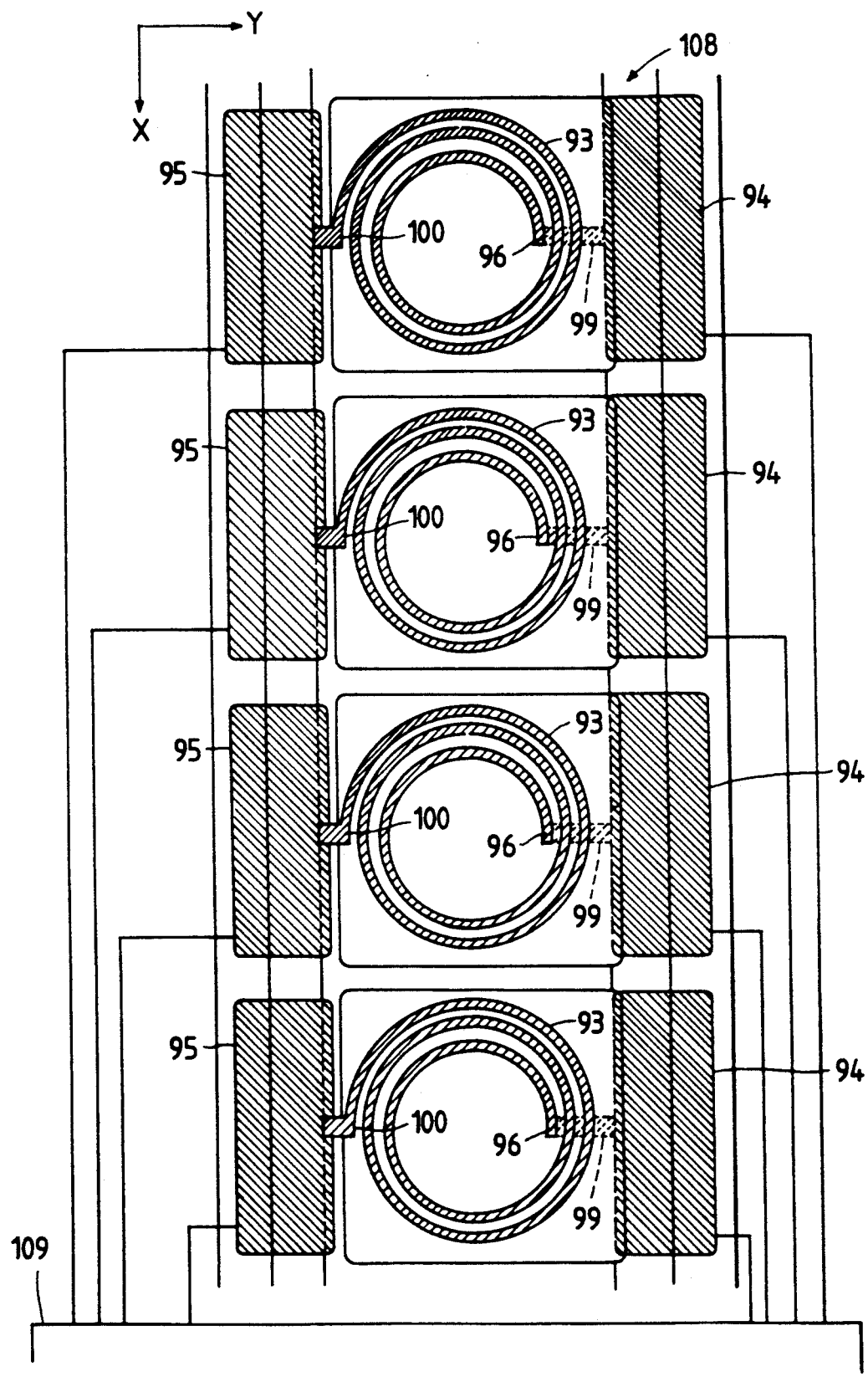

FIG. 14 shows an embodiment in which plural magnetic field generating coils are provided on the same substrate 108 composed of a magnetic block. A power source 109 is provided for driving said magnetic field generating coils. In FIG. 14, a direction X is the direction of tracking control of the optical head, and a direction Y is the direction of relative movement between the magnetic field generating device and the recording medium. The magnetic field generating device shown in FIG. 14 may naturally be employed instead of the device 70 shown in FIG. 8.

As explained in the foregoing, according to the present invention, in the magnetooptical recording method in which a magnetooptical recording medium is heated with a light beam from an optical head and is subjected simultaneously to the application of a bias magnetic field so as to represent invention by the direction of magnetization of a magnetic domain, a magnetic field generating coil having a main field component perpendicular to the recording layer of said recording medium is formed in such a manner that the coiled portion thereof is formed on a plane close to said recording medium and the terminals, connected to said coiled portion through conductors, are formed on a second plane which is more spaced than the first-mentioned plane from said recording medium.

Therefore, even when the lead wires are connected to said terminals by soldering or by bonding, the coiled portion of said magnetic field generating coil can be positioned very close to the surface of the recording medium. Consequently the magnetic field generating device of the present invention can sufficiently provide a uniform area of necessary magnetic field, ensures the reliability of recording and enables the use of a floating mechanism despite a small inductance. Also the low inductance enables a high frequency switching operation, a high transfer rate and a high density recording.

Figure 15A:
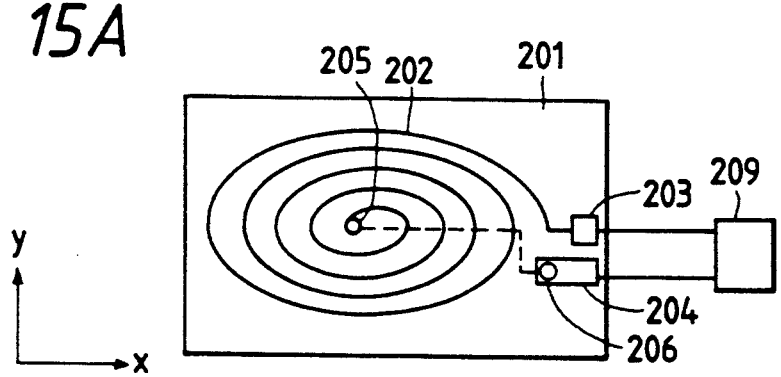
FIGS. 15A and 15B are respectively a plan view and a cross-sectional view of an embodiment of the magnetic field generating device of the present invention.
Figure 15B:
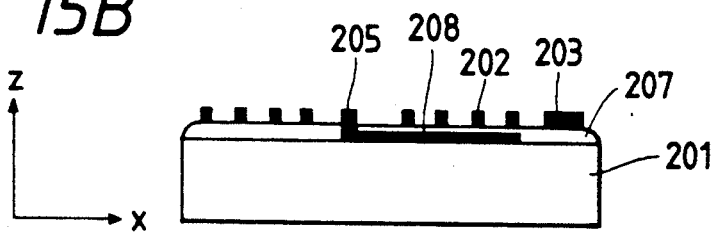

In the following there will be explained still another embodiment of the magnetic field generating device of the present invention, with reference to the attached drawings. Since the entire structure of the magnetooptical recording apparatus is similar to that shown in FIG. 2, the explanation will be concentrated on the structure of the bias field generating device of the present invention. The bias field generating device of the present embodiment is formed by thin film technology, as shown in FIGS. 15A and 15B, by forming a conductive pattern 208 on a block 201 of a magnetic material constituting a substrate, depositing an insulating layer 207 except for connection points 205, 206 at the both ends of said conductive pattern 208, and forming, on the upper surface of said insulating layer 207, a spiral printed coil 202, a terminal 203 connected to the outer end of said coil 202 and a terminal 204 connected to said conductive pattern 208 at said point 206 by conductive patterns. The inner end of said coil 202 is connected to said point 205. If necessary there may be provided a protective insulating layer on said insulating layer 207, so as to cover the printed coil 202.

The magnetic block 201 is preferably composed of a magnetic material with satisfactorily high frequency characteristics, such as high frequency ferrite, having a low high-frequency loss and a high magnetic permeability. In the present embodiment, the printed conductors such as the conductive pattern 208 and the printed coil 202 are preferably formed by evaporation or sputtering, with a highly conductive material such as copper. There may also be employed a method leaving the desired pattern, such as etching.

The printed coil 202 is formed as a spiral of oval form having different sizes in mutually perpendicular two directions, longer in the y-direction (direction of the information track on the recording medium) and shorter in the x-direction (direction of tracking control of the optical head, perpendicular to said track). Consequently the mounting direction of said bias field generating device has to be adjusted in the magnetooptical recording apparatus, with respect to the recording medium.

Thus the bias field generating coil shown in FIG. 15 generates a magnetic field in a direction +Z or −Z respectively when a current is supplied from the terminal 203 to 204, or from 204 to 203 by a magnetic field generating power source 209 for driving said coil.

Figure 16:
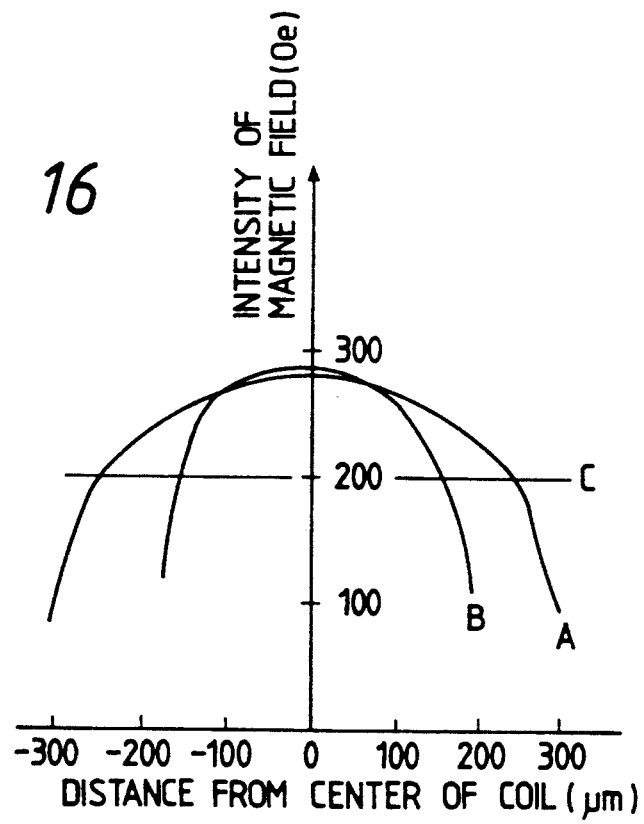
FIG. 16 is a chart showing the distribution of a magnetic field of the bias field generating device of the present invention.

FIG. 16 illustrates the distribution of the bias magnetic field generated by the bias field generating device explained above, and shows, in the ordinate, the magnitude of the vertical magnetic field component applied to the recording layer of the magnetooptical disk, as a function of the distance from the center of the printed coil in the abscissa. In FIG. 16, a curve A represents the distribution in the x-direction, while a curve B represents the distribution in the y-direction, and a line C indicates the minimum bias field required for recording. The chart indicates that, in the x-direction of tracking control of the optical head, the magnetic field has to be at least equal to 200 Oe in a range for example of ±200 μm including the possible alignment error between the optical head and the bias field generating device and the movable range of the light beam by the tracking actuator. Also in the direction perpendicular to the moving direction of the tracking actuator, the magnetic field needs to be at least 200 Oe in a range for example of ±100 μm capable of covering the possible alignment error between the light beam from the optical head and the center of the bias field generating device in the y-direction and the positional aberration by vibration or time-dependent change. Thus the area of the main component of the magnetic field to be applied to the recording layer of the magnetooptical recording medium is significantly different between the tracking direction of the optical head and the perpendicular direction. In fact, that area can be made as small as possible in the direction of an information track of said recording medium, and can be so selected, in the tracking direction, that the uniform area of said magnetic field covers the movable range of said light beam in the fine tracking operation.

As explained in the foregoing, the bias field generating device of the present embodiment can generate a uniform magnetic field in a sufficiently wide area in the moving direction of the light beam by the fine tracking actuator but does not generate the magnetic field in an unnecessarily wide area in the perpendicular direction of the information track, thereby reducing the variation in the record pits resulting from unevenness of the magnetic field and drastically lowering the frequency of generation of errors. Also since a large magnetic field is not applied to the area not subjected to recording, the recorded information is changed, so that the reliability can be ensured for a prolonged period. Also the present embodiment is advantageous for compactization and weight reduction of the bias field generating device, since the length of the magnetic block can be minimized particularly in the y-direction. Also since the coil pitch can be reduced in the y-direction, the coil 202 can further reduce the inductance, thereby further improving the high frequency switching performance.

Figure 17:
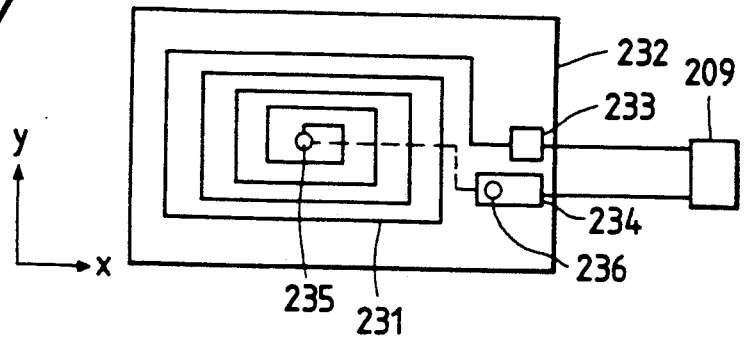
FIG. 17 is a plan view of another embodiment of the magnetic field generating device of the present invention.

FIG. 17 shows another embodiment of the magnetic field generating device of the present invention, in a plan view of an upper printed coil 231. The coil 231 is formed as a rectangular spiral, longer in the x-direction. There are also shown a magnetic block 232, terminals 233, 234, and connection points 235, 236.

Figure 18A:
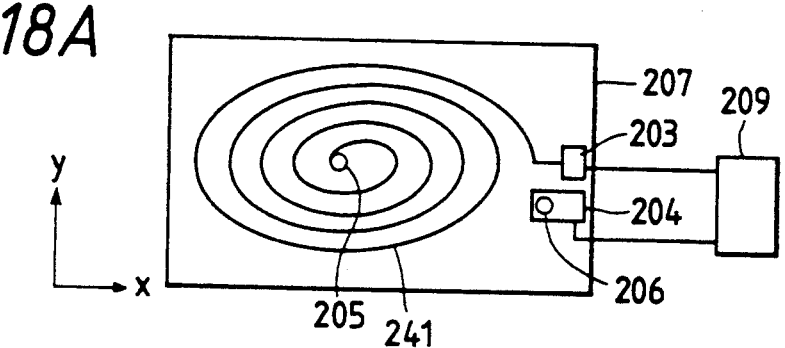
FIGS. 18A and 18B are respectively a plan view and a partially removed plan view of still another embodiment of the magnetic field generating device.
Figure 18B:
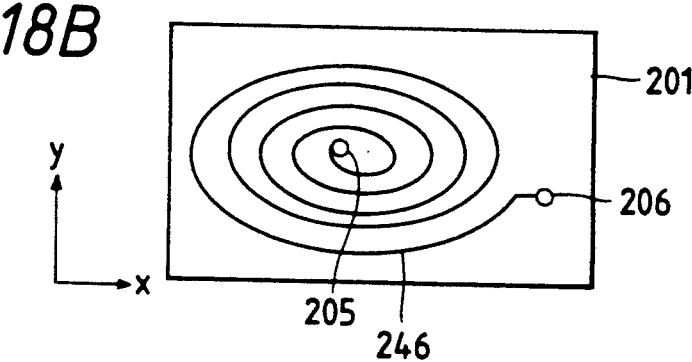

FIGS. 18A and 18B show still another embodiment of the magnetic field generating device of the present invention, in which the upper printed coil 241 is similar to that shown in FIG. 15, but the printed conductor pattern 208 is replaced by a lower printed coil 246 wound inversely to said upper coil 241 and connected thereto at the connection points 244, 245. Thus the number of turns of the coil is doubled, and a doubled magnetic field can be generated with the same driving current. Such structure is effective in case the bias field generating device cannot be positioned close to the magnetooptical disk, or a large bias magnetic field is required, for any reason. The form of the spiral coil is not limited to rectangular form but can naturally be modified in other forms such as an oval form.

In each of the foregoing embodiments there is employed a coil, but there may be employed plural magnetic field generating coils.

FIG. 19 shows an embodiment in which plural magnetic field generating coils are provided on the same substrate 250 composed of a magnetic block. A power source 251 is provided for driving said magnetic field generating coils. In FIG. 19, a direction X is the direction of tracking control of the optical head, and a direction Y is the direction of relative movement between the magnetic field generating device and the recording medium. The magnetic field generating device shown in FIG. 19 may naturally be employed in place of the bias field generating device 70 shown in FIG. 8.

As explained in the foregoing, according to the present invention, in the magnetooptical recording method in which a magnetooptical recording medium is heated with a light beam from an optical head and is subjected simultaneously to the application of a bias magnetic field so as to represent information by the direction of magnetization of a magnetic domain, a magnetic field generating coil having a main field component perpendicular to the recording layer of said recording medium has such a main magnetic field distribution that is narrow in the direction of an information recording track of said magnetooptical recording medium but has an intensity enough for inverting the direction of magnetization of the domain heated by light irradiation, and is wider in the direction of tracking control which is perpendicular to said track direction so as to cover the movable range of the light beam by fine tracking.

Consequently, these embodiments no longer require the control for mutual alignment of the optical head and the bias field generating device in the fine tracking, and are therefore advantageous in structure and control. Thus said embodiments can reduce the cost and the error generation at information recording. Also since the magnetic field is not applied to an unnecessary area at information recording, the recorded information is not changed, and the reliability of recorded information can be secured for a prolonged period. Furthermore, since the coil can be minimized in the direction of a track, the bias field generating device can be compactized and provides other advantages such as the applicability in a floating mechanism. It is thus rendered possible to ensure high speed movability for example in the seeking operation of the optical head, to reduce vibration and to obtain stability and high reliability.

In the following there will be explained still another embodiment of the magnetic field generating device of the present invention, with reference to the attached drawings. In said embodiment, since the entire structure of the magnetooptical recording apparatus is similar to that shown in FIG. 8, the following description will be concentrated on the structure of the bias field generating device of the present invention. In the present embodiment, as shown in FIGS. 20A and 20B, conductor patterns are formed by a thin film technology to constitute plural printed coils 302a, 302b, . . . for generating magnetic field, in the direction of tracking control of the optical head, on an oblong magnetic block 301 constituting the substrate and extending over the entire recording area of a magnetooptical disk serving as the magnetooptical recording medium. On both ends of said magnetic block 301, there are provided terminals 320, 321; 322, 323; . . . ; 330, 331 respectively connected to the ends of said printed coils 302a, 302b, . . . . Such structure can be obtained by forming at first conductor patterns connecting the central connection points of the printed coils 302a, 302b, . . . with the terminals 321, 323, . . . , 331, then forming an insulating layer thereon except said connection points, and forming said printed coils 302a, 302b, . . . , and terminals 320, 321; 322, 323; . . . ; 330, 331 on said insulating layer.

The magnetic block 301 is preferably composed of a magnetic material with satisfactorily high frequency characteristics, such as high frequency ferrite, having a low high-frequency loss and a high magnetic permeability. In the present embodiment, the conductor patterns are preferably formed by evaporation or sputtering, with a highly conductive material such as copper. There may also be employed a method leaving the desired pattern, such as etching. A power source 350 is provided for driving the printed coils.

Printed coils 302a, 302b, . . . are so sized that the areas of magnetic field of the intensity required for inversion of the magnetic domain are not continuous between the adjacent coils, but are so constructed as to generate a magnetic field enough for inverting the magnetic domain between the magnetic fields corresponding to adjacent coils when they are simultaneously driven, and are so driven that said magnetic fields become continuous in the direction of tracking control of the optical head. Also said area is so sized as to cover the movable range of the light beam by the fine tracking actuator of the optical head and the range of eventual positional aberration by vibration. For example, if said range including the movable range of said tracking actuator and the alignment error between the optical head and the bias field generating device is $\pm 300$ $\mu$m, said coil is so sized as to provide the necessary perpendicular magnetic field in an area of at least $\pm 300$ $\mu$m.

FIGS. 21A and 21B show the distribution of the magnetic fields generated by the above-explained bias field generating device, wherein the abscissa indicates the distance from the center of the magnetooptical disk while the ordinate indicates the magnitude of the perpendicular magnetic component applied to the recording layer of said magnetooptical disk. Curves Aa, Ab, . . . indicate the distributions of the magnetic fields respectively generated by the printed coils 302a, 302b, . . . , and a line Hb indicates the minimum value of the bias magnetic field required for information recording. In the present embodiment, the magnetic field generated by each of the printed coils 302a, 302b, . . . is weaker than the level Hb in a position between the adjacent coils, but, when the optical head is moved to such position, the adjacent printed coils, for example 302a and 302b, are simultaneously activated by the driving means to be explained later, whereby the added magnetic fields a+b become stronger than the level Hb. Consequently the area of magnetic field enough for inversion of the magnetic domain becomes practically continuous, and the intensity of the magnetic field is made uniform.

FIG. 22 shows control means for energizing each or an adjacent two of the printed coils 302a, 302b, . . . corresponding to the movement of the optical head. Switches Sa1, Sa2; Sb1, Sb2;, . . . are serially connected to both ends of the printed coils 302a, 302b, . . . and are connected between the junction point between driving transistors Q1, Q2 and that between driving transistors Q3, Q4. Transistors Q1 and Q2, and those Q3 and Q4 are serially connected to a power source Vcc, and control voltages V1, V2, V3 and V4 are respectively applied to the bases of said transistors. In the case of generating the magnetic field in a direction +Z the transistors Q1 and Q4 are turned on while those Q2 and Q3 are turned off. In the case of generating the magnetic field in a direction −Z, the transistors Q2, Q3 are turned on while those Q1, Q4 are turned off.

Figure 23:
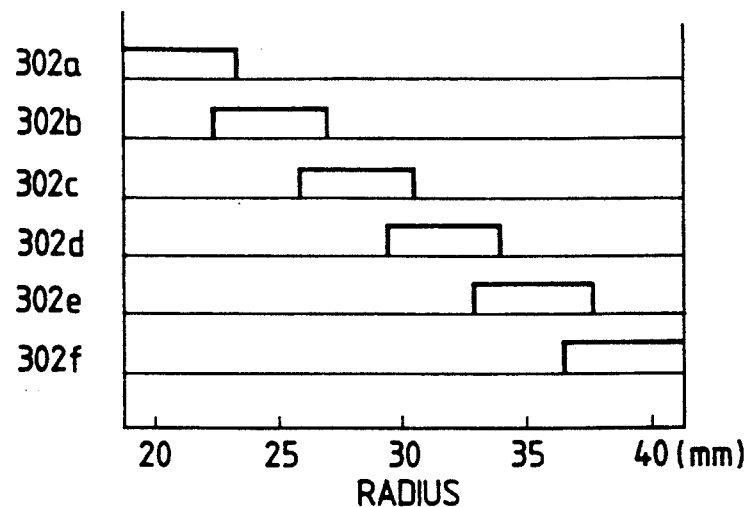
FIG. 23 is a timing chart showing the mode of driving of said coils.

Consequently, as said switches Sa1, Sa2; . . . are selectively closed with the timing shown in FIG. 23, the printed coils 2a, 2b, . . . are energized corresponding to the moving position of the optical head. Thus the driving means for the coils are controlled corresponding to the irradiating position of the light beam. In the present embodiment, in order to obtain a desired distribution of the bias magnetic field with six printed coils in a radius of 20–40 mm, each coil should provide the perpendicular field in an area of about 2.5 mm, with the assumption that the adjacent printed coils are simultaneously energized over a range of about 1 mm. The position of the optical head can be determined from the signal of a position sensor mounted in the radial direction of the magnetooptical disk, or by calculation from the track signal at the access.

In the above-explained embodiment, an insulating layer is provided on the printed conductors for the terminals 321, 323, . . . , 331, and the printed coils 302a, 302b, . . . are formed on said insulating layer, but it is also possible to form on said insulating layer, but it is also possible to form other coils of inverse winding on the magnetic block 301, to connect the centers of said printed coils, through the connection points, to the printed coils formed on the insulating layer, and to connect the outer ends of said printed coils to the terminals 320, 321; 322, 323; . . . . In this case the intensity of the magnetic field is doubled as the length of the coil is practically doubled. Such structure is effective in case the bias field generating device cannot be positioned close to the magnetooptical disk or a strong magnetic field is required, for any reason.

In the foregoing embodiment, a non-magnetic protective film may be provided on the insulating layer for protecting the printed coils.

According to the present invention, as explained above, in a magnetooptical recording apparatus in which a magnetooptical recording medium is heated by the light beam from the optical head and is subjected to the application of a perpendicular magnetic field by the bias field generating device thereby representing the information by the direction of magnetization of a magnetic domain, said bias field generating device is provided with plural magnetic field generating coils so positioned that the main magnetic component is perpendicular to the recording layer of said recording medium, wherein said coils are arranged on a plane close to said recording medium over the entire recording area of said recording medium in the direction of tracking control of the optical head and adapted to generate a magnetic field enough for inverting the magnetization of said domain in a desired area of the magnetic field, and with driving means for energizing each of said coils or an adjacent two of said coils to generate a magnetic field area of necessary intensity, corresponding to the movement of the optical head.

Such structure can reduce the electric power consumption for bias field generation, since only one or two of the magnetic field generating coils need to be energized for securing a magnetic field area necessary for the inversion of magnetization, corresponding to the movement of the optical head. Also the form and size of the coils can be easily designed since each coil can have a relatively narrow magnetic field, as a necessary magnetic field can be maintained in the area between the adjacent coils, by the cooperation of said coils.

Also since the magnetooptical recording medium is not affected by the temperature increase in the bias field generating device, the recording conditions can be stabilized and the error generation can be prevented. Furthermore, since the magnetic field generating coils can be formed, for example by a printing method, on a plane close to the magnetooptical recording medium, they can generate a perpendicular magnetic field of an intensity enough for inverting the magnetization of the domain in an area capable of covering the vibration of the light beam resulting for example from the vibration of the actuator despite the small size of said coils. For this reason the bias field generating device can be made smaller in size and in weight, sufficiently for example for being supported in a floating mechanism, and can therefore stabilize the recording conditions. Also since a desired bias field can be obtained with a relatively small current, an increase in the inductance is not required, and the high frequency switching is therefore rendered possible. Besides, in the tracking control of the optical head, correction control is not required for the positional aberration with the bias field generating device. Consequently there is provided a magnetooptical recording apparatus of high performance and high reliability.

Figure 24A:
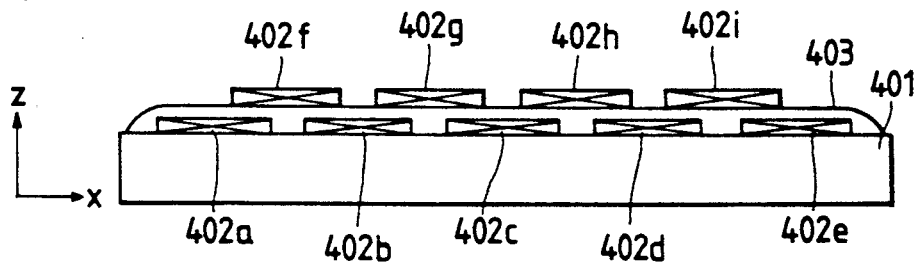
FIGS. 24A, 24B and 24C are respectively a lateral view, a plan view and a partially removed plan view of an embodiment of the magnetic field generating device of the present invention.
Figure 24B:
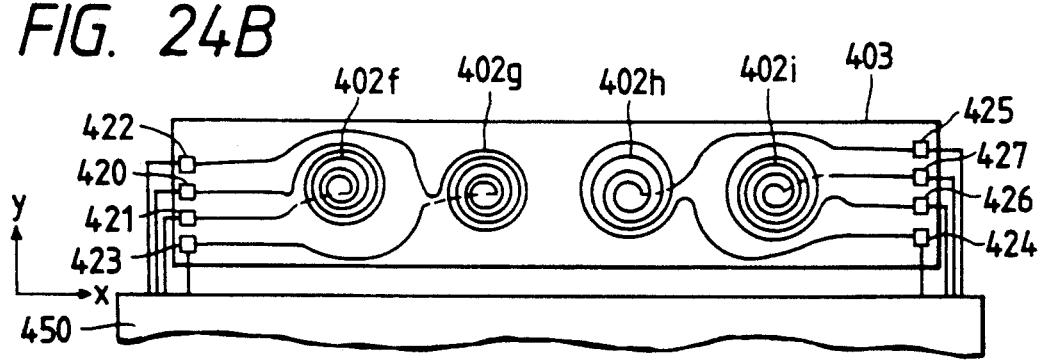
Figure 24C:
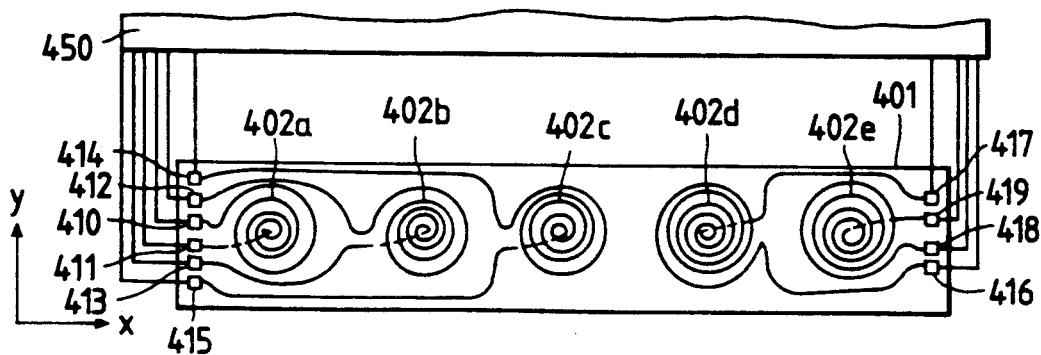

In the following there will be explained still another embodiment of the magnetic field generating device of the present invention, with reference to the attached drawings. In said embodiment, as the entire structure of the magnetooptical recording apparatus is similar to that shown in FIG. 8, the following description will be concentrated on the structure of the bias field generating device. In the present embodiment, as shown in FIGS. 24A to 24C, conductor patterns are formed by thin film technology so as to constitute plural magnetic field generating printed coils 402a, 402b, . . . , 402e; 402f, 402g and 402i on upper and lower planes of a magnetic block 401 constituting a substrate and extending over the entire recording area of a magnetooptical disk, in arrays in the direction of tracking control of the optical head. Said planes are mutually parallel, and have an insulating layer 403 therebetween. Terminals 410, 411; 412, 413; . . . ; 418, 419 connected to the ends of said printed coils 402a, 402b, . . . , 402e are provided on said lower plane, while terminals 420, 421; 422, 423, . . . , 426, 427 connected to the ends of said coils 402f, 402g, . . . , 402i are provided on said upper plane. In practice, such structure can be obtained by forming conductor patterns connecting the terminals 411, 413, . . . , 419 and the central connection points of the coils 402a, 402b, . . . , 402e on said magnetic block 401, then forming an insulating layer thereon excluding said central connection points, forming the printed coils 402a, 402b, . . . , 402e and the terminals 410, 411; 412, 413; . . . ; 418, 419 on said insulating layer, further forming conductor patterns connecting the terminals 421, 423, . . . , 427 and the central connection points of the coils 402f, 402g, . . . , 402i on said insulating layer 403, forming another insulating layer thereon excluding said central connection points, and forming thereon the printed coils 402f, 402g, . . . , 402i and terminals 420, 421; 422, 423; . . . ; 426, 427. There is also provided a magnetic field generating power source 450.

The magnetic block 401 is preferably composed of a magnetic material with satisfactorily high frequency characteristics, such as high frequency ferrite. Also said magnetic block 401 and insulating layer 403 are preferably provided with a low high-frequency loss and a high magnetic permeability. In the present embodiment, the printed conductors are preferably formed by evaporation or sputtering, with a highly conductive material such as copper. There may also be employed a method of leaving the desired pattern, such as etching.

Printed coils 402a, 402b, . . . , 402e are so sized that the magnetic field areas of the intensity enough for inverting the magnetization are not continuous between the adjacent coils, but said areas become continuous in the direction of tracking control of the optical head since the printed coils 402f, 402g, . . . , 402i arranged on the other plane are displaced by a half pitch from the above-mentioned coils 402a, 402b, . . . , 402e. Also said magnetic field area is so selected as to cover the movable range of the light beam by the fine tracking actuator of the optical head and the positional aberration by vibration. For example the coil is so sized to generate the necessary magnetic field at least in an area of ±300 μm, if the sum of the movable range of said tracking actuator and the alignment error between the optical head and the bias field generating device is ±300 μm.

Also the number of coils arranged in the x-direction is determined from the length of the recording range in the radial direction of the magnetooptical disk, in consideration of the magnetic field area covered by a coil and the overlapping of coils in the upper and lower planes. For example, for a size of each coil of 1 mm, an overlapping length of 0.1 mm and a radial range of recording area of 20–40 mm, there can be provided 12 coils on the first (lower) plane and 11 coils on the second (upper) plane.

The first magnetic field generating coils provided on said first (lower) plane are arranged linearly, and the second magnetic field generating coils provided on said second (upper) plane are arranged linearly, parallel to the direction of arrangement of said first coils. Said first and second coils are so arranged that the centers thereof do not mutually coincide.

FIGS. 25A and 25B show the distribution of the magnetic fields generated by the above-explained bias field generating device, wherein the abscissa indicates the distance from the center of the magnetooptical disk while the ordinate indicates the magnitude of the perpendicular magnetic component applied to the recording layer of said magnetooptical disk. Curves Aa, Ab, . . . indicate the distributions of the magnetic fields respectively generated by the printed coils 402a, 402b, . . . , and a line Hb indicates the minimum value of the bias magnetic field required for information recording. In the present embodiment, the magnetic field generated by each of the coils in the group 402a, 402b, . . . , 402e and the group 402f, 402g, . . . , 402i is weaker than the level Hb in the positions of overlapping of solid lines or broken lines between the adjacent coils, but the magnitude of the magnetic field can be made stronger than the level Hb by the combination of said groups. Consequently the areas of magnetic field enough for the inversion of domain become practically continuous, and there is obtained a uniform intensity of the magnetic field.

Figure 26:
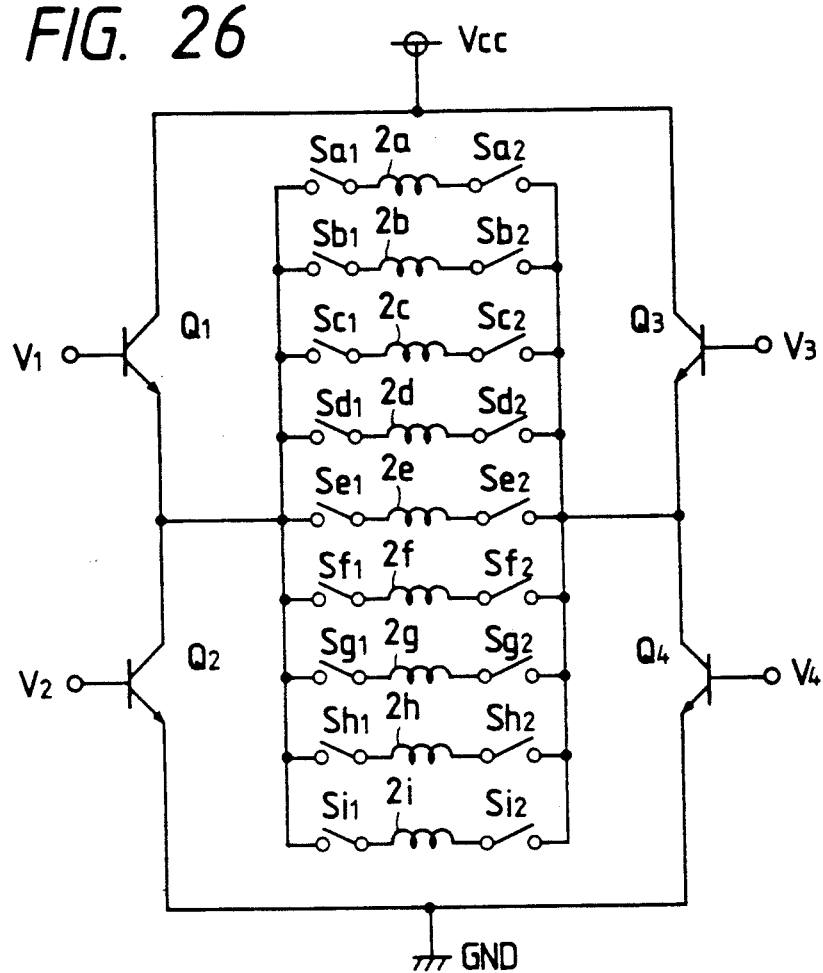
FIG. 26 is a circuit diagram of a control circuit for magnetic field generating coils.

FIG. 26 shows control means for individually energizing the printed coils 402a, 402f, 402b, 402g, 402c, . . . corresponding to the movement of the optical head. Switches Sa1, Sa2; Sb1, Sb2; . . . ; Si1, Si2 are serially connected to both ends of the printed coils 402a, 402b, . . . , 402i and are connected between the junction point between driving transistors Q1, A2 and that between driving transistors Q3 and Q4. Transistors Q1 and Q2, and those Q3 and Q4 are serially connected to a power source Vcc, and control voltages V1, V2, V3 and V4 are respectively supplied to the bases of said transistors. In a case of generating the magnetic field in a direction +Z, the transistors Q1 and Q4 are turned on while those Q2 and Q3 are turned off. In a case of generating the magnetic field in a direction −Z, the transistors Q2, Q3 are turned on while those Q1, Q4 are turned off.

Figure 27:
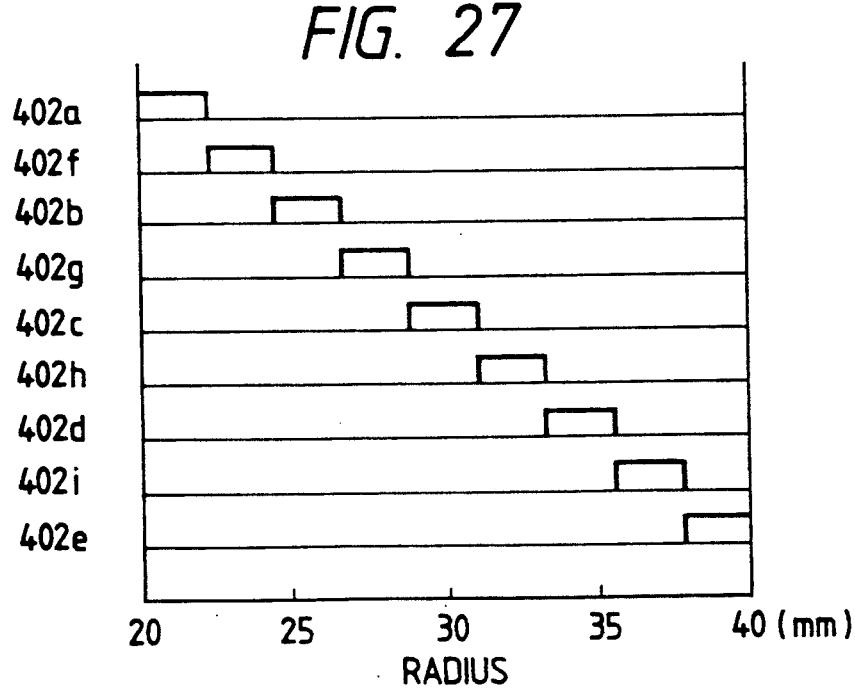
FIG. 27 is a timing chart showing the mode of driving of said coils.

Consequently, as said switches Sa1, Sa2; . . . are selectively closed with the timing shown in FIG. 27, the printed coils 402a, 402b, . . . are energized corresponding to the moving position of the optical head. Thus the driving means for the coils are controlled corresponding to the irradiating position of the light beam. In the present embodiment, in order to obtain a desired distribution of the bias magnetic field with 9 coils over a radial range of 20–40 mm, each coil should cover an area of about 2.3 μm. The position of the optical head can be determined from the signal of a position sensor mounted in the radial direction of the magnetooptical disk, or by calculation from the track signal at the access.

In the foregoing embodiment, the printed coils 402a, 402b, . . . , 402e of the first plane are formed on an insulating layer provided on the conductors for the terminals 411, 413, . . . , 419, and those 402f, 402g, . . . , 402i of the second plane are likewise formed on an insulating layer provided on the conductors for the terminals 421, 423, . . . , 427. However it is also possible to form, on the magnetic block 401 and the insulating layer 403, inversely wound printed coils and connect the centers thereof, through connection points, with the above-mentioned coils 402a, 402b, . . . , 402e and 402f, 402g, . . . , 402i. The outer ends of the printed coils are connected to the terminals 410, 411;, 412, 413, . . . and 420, 421; 422, 423; . . . . In this case the intensity of the concentrated magnetic field is doubled, since the length of each coil is practically doubled. Such structure is advantageous in case the bias field generating device cannot be positioned close to the magnetooptical disk or a strong magnetic field is needed, for any reason.

Figure 28A:
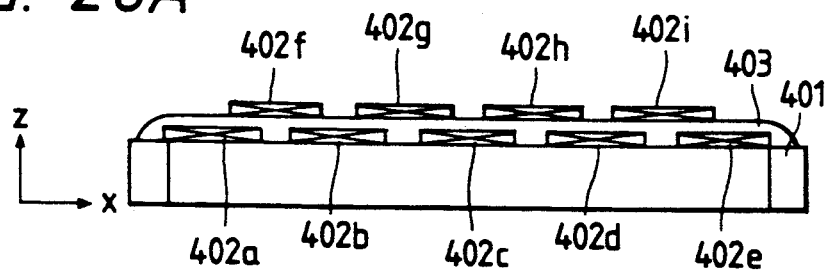
FIGS. 28A, 28B and 28C are respectively a lateral view, a plan view and a partially removed plan view of another embodiment of the magnetic field generating device of the present invention.
Figure 28B:
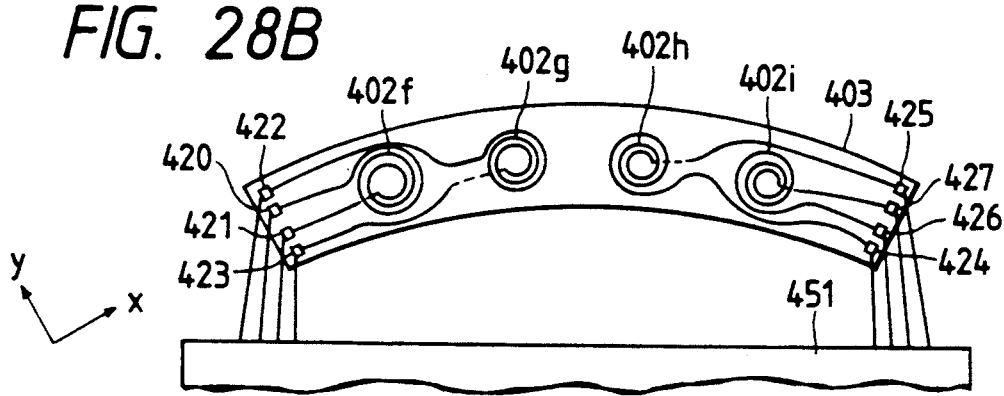
Figure 28C:
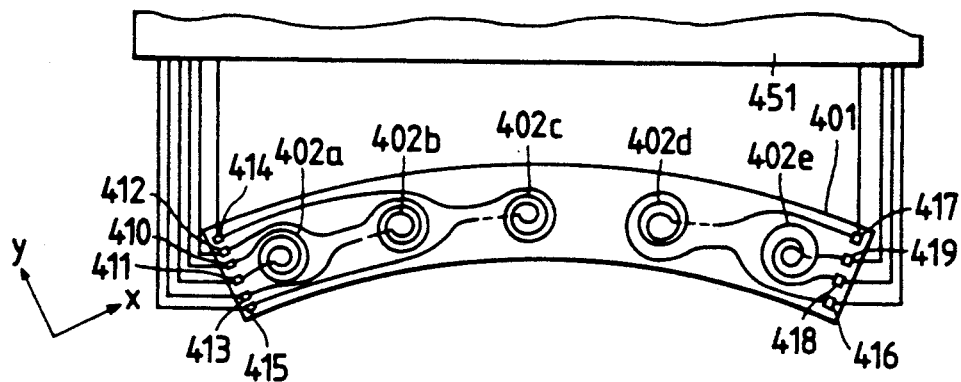

If the objective lens of the optical head is supported on an end of an arm and performs an arc-shaped scanning motion, with a radius from the rotary shaft of said arm to said objective lens, at the tracking control, the bias field generating device is constructed as shown in FIGS. 28A, 28B and 28C, in which the magnetic field generating coils are arranged along said arc. There is provided a power source 451 for energizing said coils.

In the foregoing embodiment, a non-magnetic protective film may be provided for protecting the printed coils 402f, 402g, . . . , 402i on the upper insulating layer.

According to the present invention, as explained in the foregoing, in a magnetooptical recording apparatus in which the magnetooptical recording medium is heated with the light beam from the optical head and is simultaneously subjected to the perpendicular magnetic field of the bias field generating device so as to represent the information by the direction of magnetization the magnetic domain, said bias field generating device is provided with plural magnetic field generating coils having a main magnetic field component perpendicular to the recording layer of said recording medium. Said coils are arranged on two planes close to said recording medium, along the direction of tracking control of the optical head and over the entire recording range of said recording medium, in such a manner that the coils on one plane and those on the other are mutually displaced by a half pitch and that the areas of magnetic field of the intensity required for inversion of magnetization become continuous between the mutually overlapping coils respectively on both planes. Also there is provided means for energizing said magnetic field generating coils corresponding to the movement of the optical head.

Such structure can reduce the electric power consumption for generation of the bias magnetic field, since only one or two magnetic field generating coils are energized corresponding to the movement of the optical head. Because of this fact, the magnetooptical recording medium is not affected by the heat of the bias field generating device, so that the recording conditions can be stabilized and the formation of errors at recording can be prevented. Particularly in the direction of tracking control, the magnetic field generating coils are arranged on two planes with mutual displacement of a half pitch in such a manner that the areas of required magnetic field mutually overlap between the vertically overlapping adjacent coils, so that the intensity of the perpendicular magnetic field is made uniform by successive energization of said coils, whereby the recording conditions are further improved. Consequently the bias field generating device can be made smaller in size and weight, and the high speed access is rendered possible. Besides, as the magnetic field generating coils can be prepared, for example by printing technology, on two planes positioned close to the magnetooptical recording medium, they can provide an area of perpendicular magnetic field of an intensity enough for inverting the magnetization of the magnetic domain and a size not affected by the vibration of the light beam resulting for example from the vibration of the actuator of the optical head, despite the limited size of said coils. Furthermore, since the required bias field can be obtained with a relatively small current, there is not required an increase in the inductance, and the high frequency switching operation can be therefore rendered possible. Also the tracking control of the optical head does not require the correction control for the alignment error with the bias field generating device. Thus there is provided a magnetooptical recording apparatus of high performance and high reliability.

In a magnetooptical recording apparatus, the overwriting can be achieved either by a light modulation method in which information recording is conducted by applying the recording signal on the laser beam from the optical head, or by a magnetic field modulation method in which information recording is conducted by applying the recording signal on the bias magnetic field.

For achieving the overwriting by the magnetic field modulation method, there is required an electromagnet with a coil of small inductance, in order to modulate the direction of the bias magnetic field at a high speed.

However, there has been required a complicated control for using an electromagnet with a coil of small inductance and moving such a magnet corresponding to the movement of the optical head, and such structure has been inconvenient for replacing the recording medium.

For this reason, the present applicant proposes to prevent such drawbacks by a magnetooptical recording apparatus in which bias field applying means consisting of a linear array of plural coils of a limited number of turns is arranged perpendicularly to the scanning direction of the recording medium (radial direction in the case of a disk-shaped recording medium) and the magnetic field is applied by selectively energizing said coils corresponding to the movement of the light beam.

In such structure, the magnetic field is weak because of the limited number of turns of said coils, and the bias field generating coils have to be positioned at a distance of several tens of microns from the surface of the recording medium, in order to obtain a magnetic field of several hundred Gausses on the recording medium for recording or erasing the information.

However, a vibration of 100–200 $\mu$m is inevitable in the rotating medium, and the bias field generating coils have to follow such vibration, maintaining said distance of several tens of microns. Such control, if conducted by an independent servo mechanism, requires a complex and expensive circuit.

In the following there will be explained an embodiment of the present invention, capable of solving the above-mentioned drawbacks.

Figure 29:
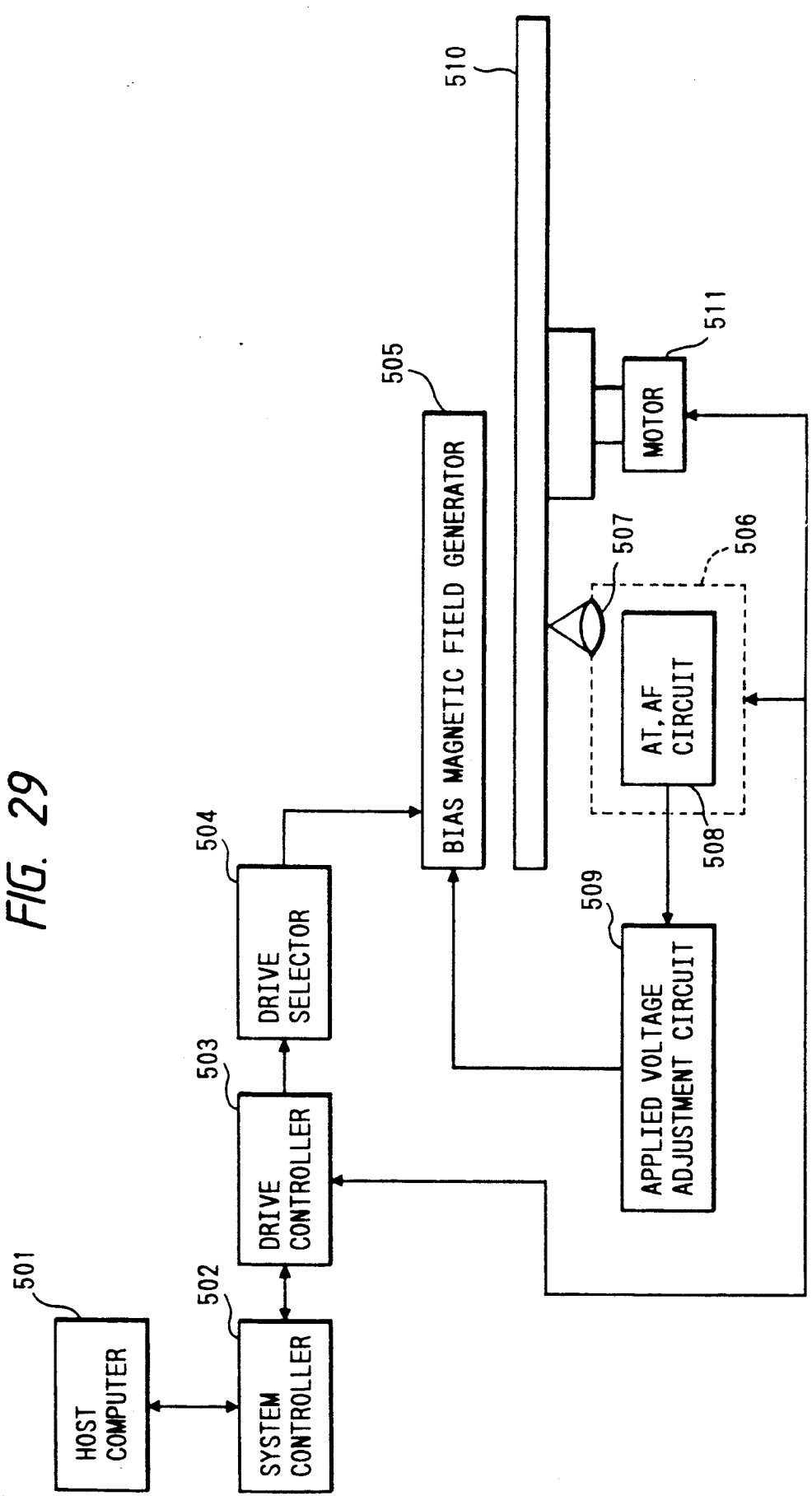
FIG. 29 is a block diagram of a magnetooptical recording apparatus of the present invention.

FIG. 29 is a schematic view of the magnetooptical recording apparatus of the present invention.

A system controller 501 executes data exchange between a host computer overall system control and a drive controller 503, which executes the recording and reading of data by controlling the drive and the optical head. Controller 503 sends signals to a drive selector at the recording and erasing of data, in relation to the movement of the optical head 506.

There are further shown a drive selector 504 for selection of the unit coils of a bias field generating device 505 according to the signal from the drive controller 503; a bias field generating device 505 having plural unit coils arranged on a rectangular substrate as shown in FIG. 20; an optical head 506; and an objective lens 507 thereof; and an auto tracking/auto focusing (AT-/AF) circuit 508 incorporated therein.

An applied voltage adjusting circuit 509 calculates and adjusts the voltage applied to the piezoelectric ceramic material, based on a focus error signal from said AF circuit and in consideration of the hysteresis (voltage-displacement characteristics) of said piezoelectric ceramic material). The adjustment conducted by said circuit 509 includes, for example, the inversion of the focus error signal in a case when the optical head 506 and the bias field generating device 505 are positioned across the magnetooptical disk 510. Also there is conducted, if necessary, a process of reducing the variation in the auto focusing error signal from the optical head 506, detected by the laser spot, so as to adapt to the movement of the rectangular bias field generating device 505, in order to avoid the eventual contact between said device 505 and the magnetooptical disk 510 resulting from vertical warpage thereof.

There are further shown a magnetooptical disk 510 constituting a recording medium, and a motor 511 for rotating said disk 510.

When receiving an instruction for data recording or erasing from the host computer 501, the drive controller 503 shifts the optical head 506 to a designated sector of a designated track on the disk, and drives a semiconductor laser with a recording or erasing power. At the same time, the drive selector 504 sends a signal for selecting a corresponding coil to the bias field generating device 505, whereby said coil effects modulation according to the recording signal in a case of recording, or generates the magnetic field in an opposite direction in a case of erasing. In this state the optical head 506 executes AT/AF control by the AT/AF circuit 508, and the obtained auto focusing signal is supplied, after calculation and adjustment in the applied voltage adjusting circuit 509 as explained above, to gap regulating means in the bias field generating device 505. In this manner the distance between the coils and the disk is indirectly detected by the AF signal for detecting the distance between the optical head and the disk.

Figure 30:
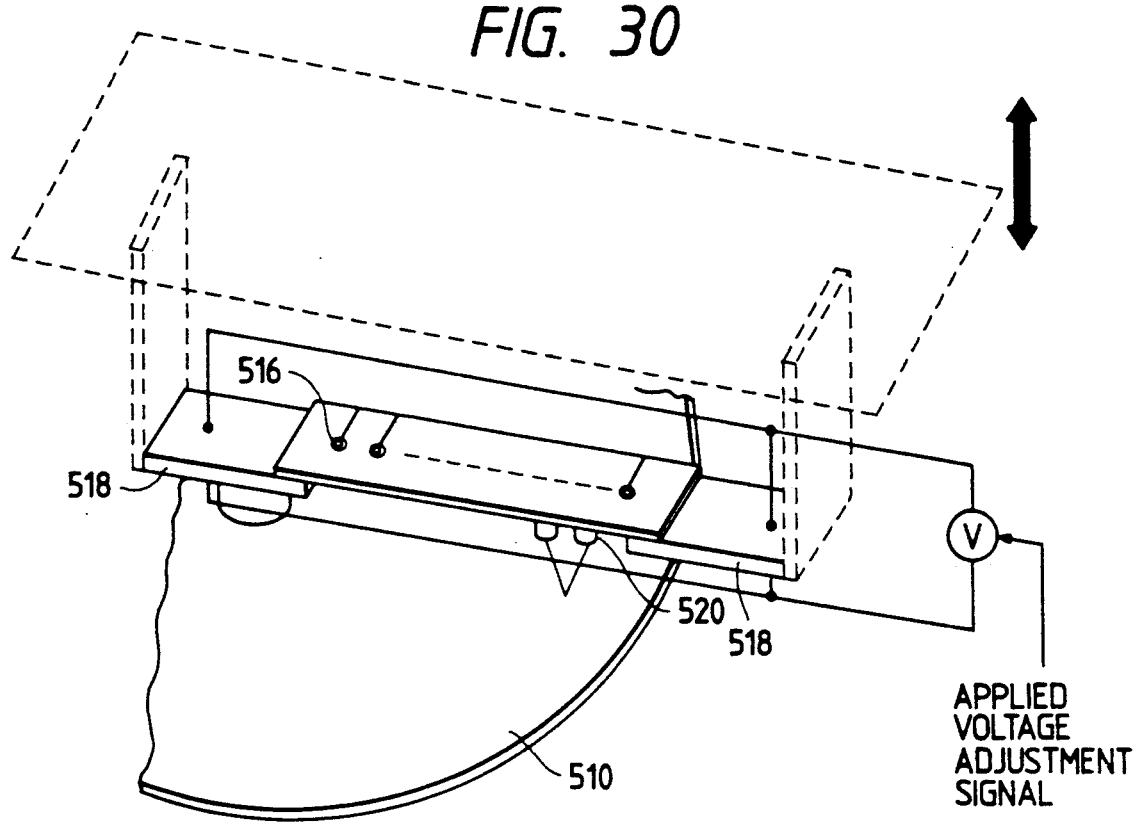
FIG. 30 is a schematic view of a bias field applying device employable in the present invention.

FIG. 30 is a magnified view of an embodiment of the bias field generating device 505 of the present invention.

On a rectangular substrate, there are provided plural magnetic field generating coils 516 which are respectively connected with the drive selector 504.

A non-contact sensor 520 is provided for maintaining the entire device 505 at a predetermined distance from the magnetooptical disk 510, and serves to control the distance of said device 505 based on the focus error signal from the AF circuit when the distance becomes shorter than said predetermined value.

Piezoelectric ceramic plates 518 serve as the gap regulating means for regulating the gap between the bias field generating device and the disk 510. Two rectangular ceramic plates 518 are placed on both sides as shown in FIG. 30, and the rectangular substrate, supporting the magnetic field generating coils 516, is placed thereon. As said piezoelectric ceramic plates 518 execute deformation substantially in proportion to the applied voltage, the gap between the magnetooptical disk 510 and the bias field generating device 505 can be easily maintained at a constant value, by means of the focus error signal from the AF circuit.

In the foregoing embodiment, piezoelectric ceramic plates are employed for regulating the gap between the bias field generating device and the magnetooptical disk 510, but there may be employed other means for this purpose.

Figure 31:
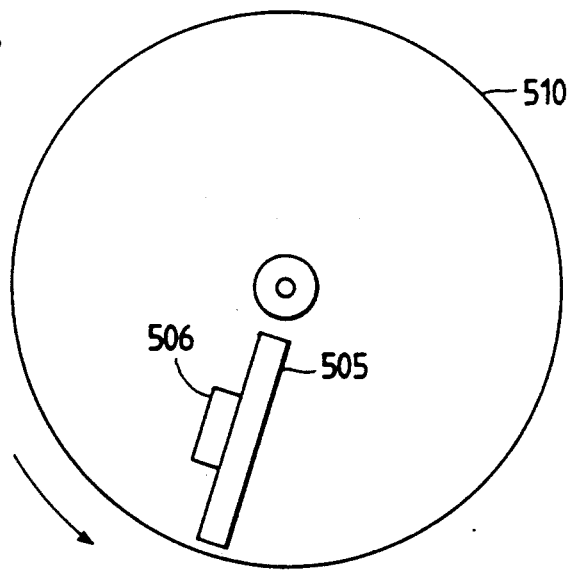
FIG. 31 is a schematic view showing the positional relationship between the bias field generating device and the optical head.

Also in case the optical head 506 and the bias field generating device 505 can be positioned on the same side of the disk, as shown in FIG. 31, for example by a multi-layered structure of the recording medium, the focus error signal from the optical head can be substantially directly utilized.

In the foregoing description, the magnetic field generating means positioned close to the recording medium for modulating the magnetic field according to the recording signal is provided with a plurality of unit magnetic field generating means, but the concept of the present invention for controlling the position of the magnetic field generating means with respect to the recording medium, by means of the focus error signal from the auto focusing circuit, is applicable also to the conventional magnetic field generaitng means with a single coil of a small number of turns.

According to the present invention, as explained in the foregoing, in a magnetooptical recording apparatus provided with an optical head for irradiating a magnetooptical recording medium with light and focus signal detecting means for detecting the distance between said medium and said optical head, there are provided magnetic field generating means positioned close to said recording medium and equipped with a plurality of unit magnetic field generating means for modulating the magnetic field according to the recording signal, and distance regulating means for regulating the distance between said magnetic field generating means and said magnetooptical recording medium, wherein said distance regulating means is driven by a focus signal from said focus signal detecting means.

The present invention is also featured by a fact that said distance regulating means is composed of a piezoelectric ceramic material.

The present invention is also featured by a fact that said distance regulating means and said optical head are positioned across said magnetooptical recording medium, and said distance regulating means is driven by a signal obtained by inversion and predetermined regulation of the focus signal from said focus signal detecting means.

The present invention is also featured by a fact that said distance regulating means and said optical head are positioned in the same side of the magnetooptical recording medium, and said distance regulating means is driven substantially directly by the focus signal from said focus signal detecting means.

The present invention is also featured, in a magnetooptical recording apparatus provided with an optical head for irradiating a magnetooptical recording medium with light and focus signal detecting means for detecting the distance between said medium and said optical head, by a fact that there are provided magnetic field generating means positioned close to said recording medium and adapted for modulating the magnetic field according to the recording signal, and distance regulating means for regulating the distance between said magnetic field generating means and said magnetooptical recording medium, wherein said distance regulating means is driven by a focus signal from said focus signal detecting means.

As explained in the foregoing, the magnetooptical recording apparatus of the present invention provides an advantage of easily maintaining a constant distance between the recording medium and the bias field generating device, in the positioning of the bias field generating device in the focusing direction, utilizing a focus error signal from the auto focusing circuit of the optical head.

What is claimed is:

1. A magnetic field generating device comprising:
   a substrate having a first face and a second face, different from the first face, the second face being stepped from the first face by a distance greater than 0.2 mm;
   a magnetic field generating coil formed on the first face of said substrate;
   terminals connected through conductive portions to said magnetic field generating coil and provided on the second face of said substrate; and
   drive means, connected to said terminals, for driving said magnetic field generating coil.

2. A device according to claim 1, further comprising a plurality of said magnetic field generating coils provided on said substrate.

3. A device according to claim 1, wherein said magnetic field generating coil comprises a printed coil.

4. A magnetooptical recording apparatus comprising:
   an optical head for irradiating a magneto-optical recording medium with a light beam; and
   a magnetic field generating device for applying a magnetic field to the magnetooptical recording medium, said device comprising (i) a substrate having a first face and a second face, different from the first face, the second face being stepped from the first face by a distance greater than 0.2 mm, (ii) a magnetic field generating coil formed on the first face of said substrate, (iii) terminals connected through conductive portions to said magnetic field generating coil and provided on the second face of said substrate, and (iv) drive means, connected to said terminals, for driving said magnetic field generating coil.

5. A magnetooptical recording apparatus comprising:

an optical head for irradiating a magneto-optical recording medium with a light beam, said optical head being under tracking control in a tracking direction; and a magnetic field generating device for applying a magnetic field to the magnetooptical recording medium, said device comprising (i) a substrate having a first face and a second face, different from the first face, the second face being stepped from the first face by a distance greater than 0.2 mm, (ii) a plurality of magnetic field generating coils formed on the face of said substrate and being arranged in the tracking direction of said optical head, (iii) terminals connected through conductive portions to said magnetic field generating coils and provided on the second face of said substrate, and (iv) drive means, connected to said terminals, for driving said magnetic field generating coils.

6. A magnetooptical recording apparatus according to claim 4, further comprising a plurality of said magnetic field generating coils provided on said substrate.

7. A magnetooptical recording apparatus according to claim 4, wherein said magnetic field generating coil comprises a printed coil.

8. A magnetooptical recording apparatus according to claim 5, wherein said magnetic field generating coils comprise printed coils.

* * * * *

UNITED STATES PATENT AND TRADEMARK OFFICE
CERTIFICATE OF CORRECTION

PATENT NO. : 5,293,360
DATED : March 8, 1994
INVENTOR(S) : Koyo HASEGAWA et al.

It is certified that error appears in the above-identified patent and that said Letters Patent is hereby corrected as shown below:

COLUMN 4:

Line 58, "of" should read --of a--.

COLUMN 5:

Line 12, "of" should read --of a--; and
    Line 37, "of," should read --of--.

COLUMN 6:

Line 67, "+200" should read --$\pm$200--.

COLUMN 8:

Line 64, "intension" should read --intention--.

COLUMN 10:

Line 14, "state" should read --state,--.

COLUMN 13:

Line 43, "compac-" should read --compact--;
    Line 44, "tized" should be deleted; and
    Line 59, "generating" should read --generating a--.

UNITED STATES PATENT AND TRADEMARK OFFICE
CERTIFICATE OF CORRECTION

PATENT NO. : 5,293,360

DATED : March 8, 1994

INVENTOR(S) : Koyo HASEGAWA et al.

It is certified that error appears in the above-identified patent and that said Letters Patent is hereby corrected as shown below:

COLUMN 18:

Line 62, "magnetization" should read --magnetization of--.

COLUMN 21:

Line 53, "generaitng" should read --generating--.

Signed and Sealed this

Sixth Day of September, 1994

Attest:

BRUCE LEHMAN

Attesting Officer   Commissioner of Patents and Trademarks